United States Patent
Ogasawara et al.

(10) Patent No.: US 9,369,053 B2
(45) Date of Patent: Jun. 14, 2016

(54) POWER SUPPLY DEVICE AND LIGHTING APPARATUS USING THE SAME

(71) Applicant: Panasonic Intellectual Property Management Co., Ltd., Osaka (JP)

(72) Inventors: Kiyoshi Ogasawara, Osaka (JP); Takafumi Fujino, Osaka (JP); Hiromichi Goto, Osaka (JP); Teruhito Takeda, Hyogo (JP); Satohiko Hosomi, Osaka (JP); Kei Mitsuyasu, Osaka (JP); Katsuyuki Doi, Osaka (JP); Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/627,069

(22) Filed: Feb. 20, 2015

(65) Prior Publication Data

US 2015/0249397 A1     Sep. 3, 2015

(30) Foreign Application Priority Data

Feb. 28, 2014   (JP) .................. 2014-039148

(51) Int. Cl.
*H02M 3/335* (2006.01)
*H02M 1/42* (2007.01)
*H02M 1/00* (2007.01)
*H05B 33/08* (2006.01)
H02M 7/06 (2006.01)

(52) U.S. Cl.
CPC ........ *H02M 3/33569* (2013.01); *H02M 1/4266* (2013.01); *H05B 33/0815* (2013.01); *H02M 7/06* (2013.01); *H02M 2001/0006* (2013.01); *H02M 2001/007* (2013.01); *H02M 2001/0058* (2013.01); *Y02B 20/346* (2013.01); *Y02B 70/123* (2013.01); *Y02B 70/1491* (2013.01)

(58) Field of Classification Search
CPC .......... H02M 3/33569; H02M 1/4266; H02M 3/3353; H05B 33/0815; H05B 33/0809
USPC ...................................... 315/200 R
See application file for complete search history.

(56) References Cited

U.S. PATENT DOCUMENTS

| | | | | |
|---|---|---|---|---|
| 4,958,268 A | * | 9/1990 | Nagagata .......... | H02M 3/33584 363/16 |
| 6,038,143 A | * | 3/2000 | Miyazaki ............ | H02M 3/3385 363/19 |
| 6,639,811 B2 | * | 10/2003 | Hosotani ............. | H02M 3/3385 363/19 |

(Continued)

FOREIGN PATENT DOCUMENTS

JP            2001-339948 A         12/2001

*Primary Examiner* — Dylan White
(74) *Attorney, Agent, or Firm* — Renner, Otto, Boisselle & Sklar, LLP

(57) ABSTRACT

In a power supply device, a primary winding of a transformer is connected in series to a main switching element, and is connected in parallel to a series circuit of a resonance capacitor and a sub switching element. A secondary winding of the transformer is connected in series to a series circuit of a rectifying element and a resonance inductor. The capacitance of the resonance capacitor and the inductance of the resonance inductor are each set such that, when the sub switching element is in an on state, the waveform of the voltage that is generated between the first main terminal and the second main terminal of the main switching element takes a protruding curve shape, the voltage being generated due to a resonance phenomenon of at least the resonance capacitor and the resonance inductor.

20 Claims, 10 Drawing Sheets

(56) References Cited

U.S. PATENT DOCUMENTS

| | | | |
|---|---|---|---|
| 8,749,996 B2* | 6/2014 | Hosotani | H02M 3/33507 363/16 |
| 2002/0021575 A1* | 2/2002 | Yasumura | H02M 3/33569 363/21.04 |
| 2006/0193155 A1 | 8/2006 | Aso et al. | |
| 2010/0067259 A1* | 3/2010 | Liu | H02M 3/33569 363/21.01 |
| 2011/0051467 A1* | 3/2011 | Nakanishi | H02M 3/337 363/21.02 |
| 2012/0188798 A1* | 7/2012 | Matsumoto | H02M 3/335 363/21.12 |
| 2014/0016152 A1* | 1/2014 | Onitsuka | H04N 1/21 358/1.13 |
| 2014/0016363 A1* | 1/2014 | Chen | H02M 3/335 363/21.02 |

* cited by examiner

POWER SUPPLY DEVICE AND LIGHTING APPARATUS USING THE SAME

CROSS-REFERENCE TO RELATED APPLICATION

This application claims the benefit of priority of Japanese Patent Application Number 2014-39148, filed on Feb. 28, 2014, the entire contents of which are hereby incorporated by reference.

TECHNICAL FIELD

This invention generally relates to power supply devices and lighting apparatuses using the same, and more specifically relates to a power supply device configured to supply electric power to a load and a lighting apparatus using the same.

BACKGROUND ART

Heretofore, switching power supply circuits that are included in various electronic apparatuses as a power supply have been proposed (refer to JP 2001-339948 A, hereinafter referred to as "Document 1", for example).

A switching power supply circuit described in Document 1 includes a full-wave rectifying circuit including a bridge rectifying circuit and a smoothing capacitor, and a main switching element. Also, the switching power supply circuit includes a switching driving unit configured to drive the main switching element, and an insulated converter transformer that includes a primary winding and a secondary winding.

A MOSFET (Metal Oxide Semiconductor Field Effect Transistor) is used as the main switching element. A parallel resonance capacitor is connected between a drain and a source of the main switching element. Also, a clamp diode is connected between the drain and source of the main switching element.

An active clamp circuit is connected in parallel to the primary winding. The active clamp circuit includes an auxiliary switching element, a self-excited driving circuit configured to drive the auxiliary switching element, a clamp capacitor, and a clamp diode. The self-excited driving circuit includes a drive winding that is provided in the insulated converter transformer, a capacitor, and two resistors.

A voltage doubler half-wave rectifying circuit is formed on a secondary side of the insulated converter transformer. The voltage doubler half-wave rectifying circuit includes a secondary winding, a serial resonance capacitor, a first rectifying diode, a second rectifying diode, and a smoothing capacitor. The serial resonance capacitor is connected in series to the secondary winding. The first rectifying diode is connected in parallel to a series circuit of the secondary winding and the serial resonance capacitor. A series circuit of the second rectifying diode and the smoothing capacitor is connected in parallel to the series circuit of the secondary winding and the serial resonance capacitor.

As described above, since the voltage doubler half-wave rectifying circuit is formed on the secondary side of the insulated converter transformer in the conventional switching power supply circuit described in Document 1, it is difficult to further downsize the switching power supply circuit. Also, it is desired recently that power supply devices that are included in various electronic apparatuses as a power supply is further downsized.

SUMMARY OF THE INVENTION

The present invention has been made in view of the above-described problems, and an object of the present invention is to provide a power supply device that is capable of being further downsized, and a lighting apparatus that uses the power supply device.

A power supply device according to an aspect of the present invention includes: a power supply unit configured to generate a first DC voltage from an input voltage; a conversion unit configured to convert the first DC voltage outputted from the power supply unit to a second DC voltage that is different from the first DC voltage; and a control unit configured to control the conversion unit. The conversion unit is an active clamp type flyback converter. The conversion includes: a main switching element; a sub switching element; a flyback transformer including a primary winding and a secondary winding; and a rectifying element configured to perform half-wave rectification on a first voltage generated in the secondary winding. The main switching element and the sub switching element each include a first main terminal, a second main terminal, and a control terminal. The primary winding is connected in series to the main switching element, and is connected in parallel to a series circuit of a resonance capacitor and the sub switching element. The secondary winding is connected in series to a series circuit of the rectifying element and a resonance inductor. The control unit is configured to control the main switching element and the sub switching element. The control unit includes, as control modes, a first control mode in which the main switching element is put in an on state and the sub switching element is put in an off state, a second control mode in which the main switching element is put in an off state and the sub switching element is put in an on state, and a third control mode in which the main switching element and the sub switching element are both put in off states. The control unit is configured to alternate between the first control mode and the second control mode via the third control mode. A capacitance of the resonance capacitor and an inductance of the resonance inductor are each set such that, in a period in which the main switching element is in an off state and the sub switching element is in an on state, a waveform, with respect to time in the period, of a second voltage that is generated between the first main terminal and the second main terminal of the main switching element takes a protruding curve shape, the voltage being generated due to a resonance phenomenon of at least the resonance capacitor, the primary winding, and the resonance inductor.

A lighting apparatus according to another aspect of the present invention includes the above-described power supply device; a light source unit that can be operated by the power supply device, and an apparatus body to which the power supply device and the light source unit are attached.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Embodiment 1

Figure 1:
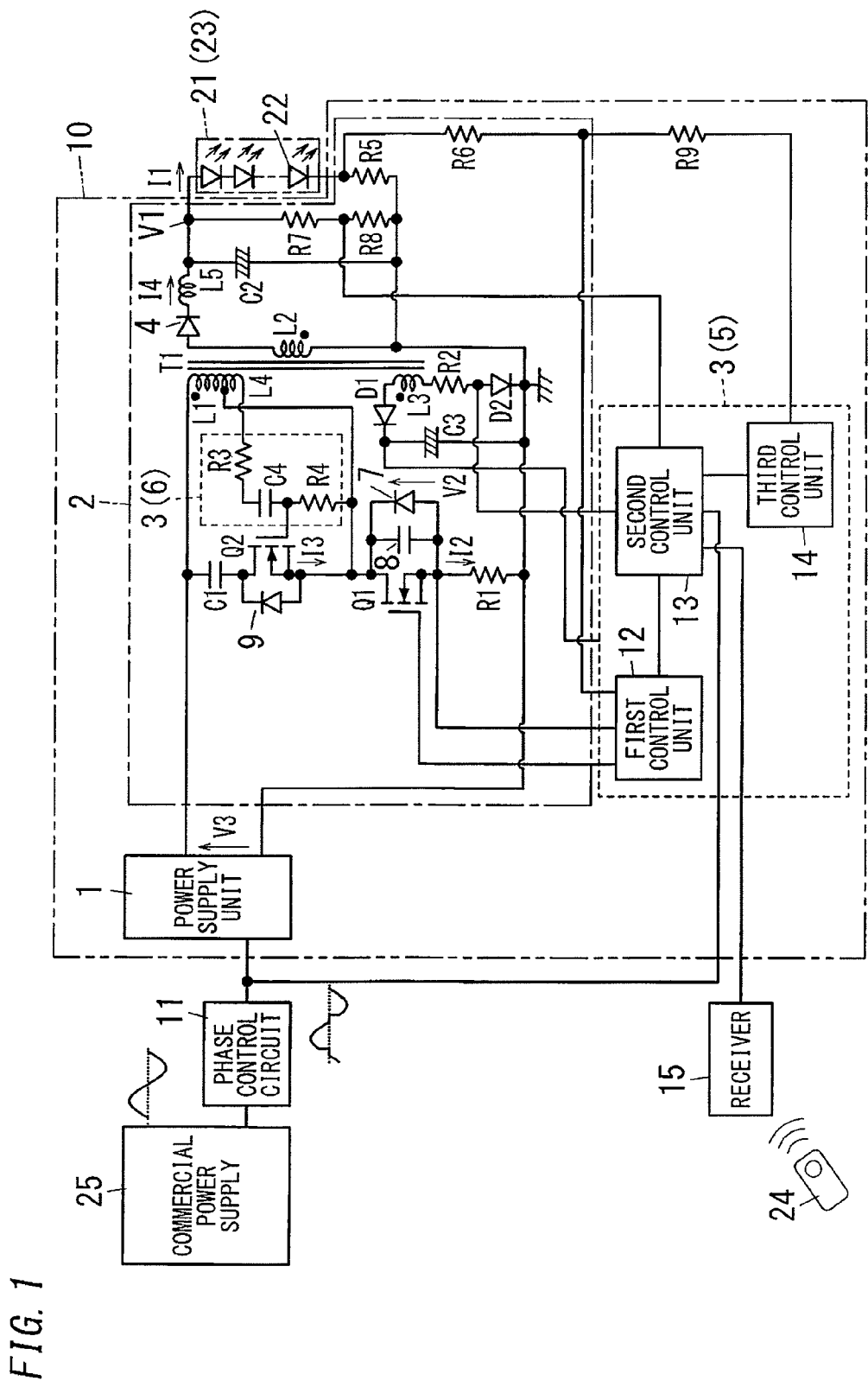
FIG. 1 is a circuit diagram of a power supply device according to Embodiment 1.

Hereinafter, a power supply device 10 according to the present embodiment will be described with reference to FIGS. 1 and 2.

The power supply device 10 is configured to supply electric power to a load 21. A light source unit 23 including two or more solid-state light emitting elements 22 or the like can be used as the load 21, for example. A light emitting diode or the like can be used as the solid-state light emitting element 22, for example. Note that the power supply device 10 does not include the load 21 as a constituent element.

The light source unit 23 includes the two or more solid-state light emitting elements 22. Although the electrical connection of the solid-state light emitting elements 22 is a serial connection, the electrical connection is not limited to a serial connection. The electrical connection of the solid-state light emitting elements 22 may be a parallel connection, or may be a connection in which a serial connection and a parallel connection are combined. The emitting light color of the solid-state light emitting element 22 is assumed to be white, but the emitting light color is not limited to white.

Although the number of the solid-state light emitting elements 22 is two or more in the light source unit 23, the number may be one. A light emitting diode is used as the solid-state light emitting element 22 in the light source unit 23, but the light emitting element is not limited to the light emitting diode. A semiconductor laser element, an organic electroluminescent element, or the like may be used as the solid-state light emitting element 22 in the light source unit 23, for example. Note that, although the light source unit 23 is used as the load 21 in the power supply device 10, the load is not limited to the light source unit 23. A secondary battery or the like may be used as the load 21 in the power supply device 10, for example.

The power supply device 10 includes a power supply unit 1 configured to generate a DC voltage (a first DC voltage) from an input voltage, a conversion unit 2 configured to convert the first DC voltage outputted from the power supply unit 1 to a DC voltage (a second DC voltage) that is different from the first DC voltage, and a control unit 3 configured to control the conversion unit 2.

A phase control circuit 11 configured to perform phase-control on a sine wave-like AC voltage is electrically connected to an input side of the power supply unit 1. A commercial power supply 25 or the like is electrically connected to an input side of the phase control circuit 11, for example. The phase control circuit 11 is configured to perform light modulation of each of the solid-state light emitting elements 22 in the light source unit 23 that is electrically connected to an output side of the conversion unit 2. A light modulator or the like can be used as the phase control circuit 11, for example.

The power supply unit 1 is configured to acquire a voltage that is phase-controlled by the phase control circuit 11 as the input voltage, and generate the first DC voltage from the input voltage. A rectifying and smoothing circuit that includes a diode bridge and a capacitor, or the like, can be used as the power supply unit 1, for example.

The conversion unit 2 is an active clamp type flyback converter. The conversion unit 2 includes a main switching element Q1, a sub switching element Q2, a flyback transformer T1, and a rectifying element 4. The main switching element Q1 and the sub switching element Q2 each have a transistor structure. A normally off type n-channel MOSFET (Metal Oxide Semiconductor Field Effect Transistor) or the like can be used as the main switching element Q1 and the sub switching element Q2, for example. The flyback transformer T1 includes a primary winding L1 and a secondary winding L2. The rectifying element 4 is configured to perform half-wave rectification on a voltage generated in the winding L2. A diode (first diode) or the like can be used as the rectifying element 4, for example. A tertiary winding L3 and a quaternary winding L4 are provided on a primary side of the transformer T1. The tertiary winding L3 and the quaternary winding L4 are magnetically coupled to the primary winding L1. Specifically, the quaternary winding L4 is magnetically coupled to the primary winding L1 such that a voltage having a polarity opposite to that of the voltage generated in the primary winding L1 can be obtained.

A first end of the primary winding L1 is connected to a high potential side of the power supply unit 1, and is connected to a first main terminal (drain terminal, in the present embodiment) of the sub switching element Q2 via a resonance capacitor C1. A second main terminal (source terminal, in the present embodiment) of the sub switching element Q2 is connected to a second end of the primary winding L1, and is connected to a first main terminal (drain terminal, in the present embodiment) of the main switching element Q1. In short, the primary winding L1 is connected in series to the main switching element Q1, and is connected in parallel to a series circuit of the resonance capacitor C1 and the sub switching element Q2.

A second main terminal (source terminal, in the present embodiment) of the main switching element Q1 is connected to a low potential side of the power supply unit 1 via a resistor R1. The low potential side of the power supply unit 1 is grounded.

Control terminals (gate terminals, in the present embodiment) of the main switching element Q1 and the sub switching element Q2 are connected to the control unit 3. A diode 7 in FIG. 1 represents a parasitic diode of an n-channel MOSFET used as the main switching element Q1. Also, a capacitor 8 in FIG. 1 represents a parasitic capacitor of the n-channel MOSFET used as the main switching element Q1. A diode 9 in FIG. 1 represents a parasitic diode of an n-channel MOSFET used as the sub switching element Q2.

A first end of the secondary winding L2 is connected to a first end of the rectifying element 4 (anode of a diode, in the present embodiment). A second end of the rectifying element 4 (cathode of the diode, in the present embodiment) is connected to a first end of a resonance inductor L5. A second end of the resonance inductor L5 is connected to a high potential side of a capacitor C2 for smoothing. A low potential side of the capacitor C2 is connected to a second end of the secondary winding L2. The second end of the secondary winding L2 is connected to the low potential side of the power supply unit 1. In short, the secondary winding L2 is connected in series to a series circuit of the rectifying element 4 and the resonance inductor L5.

The control unit 3 is configured to control the main switching element Q1 and the sub switching element Q2. Also, the control unit 3 includes, as control modes, a first control mode, a second control mode, a third control mode. The first control mode is a control mode in which the main switching element Q1 is put in an on state, and the sub switching element Q2 is put in an off state. The second control mode is a control mode in which the main switching element Q1 is put in an off state, and the sub switching element Q2 is put in an on state. The third control mode is a control mode in which the main switching element Q1 and the sub switching element Q2 are both put in off states. The control unit 3 is configured to alternate between the first control mode and the second control mode via the third control mode, as shown in FIG. 2. Note that S1 in FIG. 2 represents a period in which the control mode of the control unit 3 is the first control mode. Also, S2 in FIG. 2 represents a period in which the control mode of the control unit 3 is the second control mode. Also, S3 in FIG. 2 represents a period in which the control mode of the control unit 3 is the third control mode.

The control unit 3 includes a first control circuit 5 and a second control circuit 6. The first control circuit 5 is configured to control the main switching element Q1. The second control circuit 6 is configured to control the sub switching element Q2.

The first control circuit 5 is configured to control the main switching element Q1 based on the magnitude of an output current I1 of the conversion unit 2. The operation power supply of the first control circuit 5 is a voltage generated in the tertiary winding L3 of the transformer T1. A first end of the tertiary winding L3 is connected to an anode of a diode D1. A cathode of the diode D1 is connected to the first control circuit 5. Also, the cathode of the diode D1 is connected to the low potential side of the power supply unit 1 via a capacitor C3. A second end of the tertiary winding L3 is connected to an anode of a diode D2 via a resistor R2. The anode of the diode D2 is connected to the first control circuit 5. A cathode of the diode D2 is connected to the low potential side of the power supply unit 1. Since the tertiary winding L3 is magnetically coupled to the primary winding L1 in the power supply device 10, current flows in the tertiary winding L3 when current flows in the primary winding L1. Accordingly, the first control circuit 5 can use voltage generated in the tertiary winding L3 of the transformer T1 as an operation power supply.

The first control circuit 5 is configured to receive a first detection signal corresponding to the output current I1 of the conversion unit 2. The first control circuit 5 is connected to the low potential side of the capacitor C2 via a series circuit of a resistor R5 and a resistor R6. The light source unit 23 is connected between a connection point of the resistor R5 and resistor R6 and the high potential side of the capacitor C2 in the power supply device 10. An anode side of the light source unit 23 is connected to the high potential side of the capacitor C2. A cathode side of the light source unit 23 is connected to the connection point of the resistor R5 and the resistor R6.

The resistor R5 is a resistor for detecting the output current I1 of the conversion unit 2. That is to say, in the power supply device 10, the magnitude of a voltage across the resistor R5 corresponds to the magnitude of the output current I1 of the conversion unit 2. That is, the larger the output current I1 is, the larger the voltage across the resistor R5 is. In the power supply device 10, a voltage signal of the voltage across the resistor R5 constitutes the first detection signal for detecting the output current I1 of the conversion unit 2. That is to say, the magnitude of the first detection signal corresponds to the magnitude of the voltage across the resistor R5. The larger the voltage across the resistor R5 is, the larger the first detection signal is. Accordingly, the first control circuit 5 can detect the output current I1 of the conversion unit 2, and can control the main switching element Q1 based on the magnitude of the first detection signal. In other words, the first control circuit 5 is configured to control the main switching element Q1 based on the magnitude of the output current I1 of the conversion unit 2. Accordingly, the first control circuit 5 can make the output current I1 of the conversion unit 2 constant. That is, the control unit 3 controls the conversion unit 2 such that the output current I1 of the conversion unit 2 is constant.

Also, the first control circuit 5 is configured to receive a second detection signal that corresponds to a current I2 flowing in the main switching element Q1. The first control circuit 5 is connected to a source terminal of the main switching element Q1.

The resistor R1 is a resistor for detecting the current I2 flowing in the main switching element Q1. That is to say, in the power supply device 10, the magnitude of a voltage across the resistor R1 corresponds to the magnitude of the current I2 flowing in the main switching element Q1. That is, the larger the current I2 is, the larger the voltage across the resistor R1 is. In the power supply device 10, a voltage signal of the voltage across the resistor R1 constitutes the second detection signal for detecting the current I2 flowing in the main switching element Q1. That is, the magnitude of the second detection signal corresponds to the magnitude of the voltage across the resistor R1. The larger the voltage across the resistor R1 is, the larger the second detection signal is. Accordingly, the first control circuit 5 can detect the current I2 flowing in the main switching element Q1, and can control the main switching element Q1 based on the magnitude of the second detection signal.

The first control circuit 5 is configured to receive a power supply information signal that includes power supply information. The power supply information includes at least one of a waveform of the input voltage of the power supply unit 1, an amplitude in the input voltage of the power supply unit 1, and a phase in the input voltage of the power supply unit 1. The first control circuit 5 is connected to a connection point of the phase control circuit 11 and the power supply unit 1. In the power supply device 10, the power supply information signal is a light modulation signal (first light modulation signal) for instructing a light modulation level of the solid-state light emitting elements 22, for example, and has a waveform of a voltage on which phase control is performed by the phase control circuit 11. Accordingly, the power supply device 10 can perform light modulation of the light source unit 23 based on the power supply information (phase, in the present embodiment) of the power supply information signal, for example.

Also, the first control circuit 5 is configured to receive a third detection signal that corresponds to the output voltage V1 of the conversion unit 2. A series circuit of a resistor R7 and a resistor R8 is connected in parallel to the capacitor C2. The first control circuit 5 is connected to a connection point of the resistor R7 and the resistor R8.

The series circuit of the resistor R7 and the resistor R8 is a voltage-dividing circuit for detecting the output voltage V1 of the conversion unit 2. That is to say, in the power supply device 10, the magnitude of a voltage across the resistor R8 corresponds to the magnitude of the output voltage V1 of the conversion unit 2. That is, the larger the output voltage V1 is, the larger the voltage across the resistor R8 is. In the power supply device 10, a voltage signal of the voltage across the resistor R8 constitutes the third detection signal for detecting the output voltage V1 of the conversion unit 2. That is, the magnitude of the third detection signal corresponds to the magnitude of the voltage across the resistor R8. The larger the voltage across the resistor R8 is, the larger the third detection signal is. Accordingly, the first control circuit 5 can detect the output voltage V1 of the conversion unit 2, and can control the main switching element Q1 based on the magnitude of the third detection signal. That is, the first control circuit 5 is configured to control the main switching element Q1 based on the magnitude of the third detection signal.

The second control circuit 6 is a self-excited type control circuit. The second control circuit 6 is configured to control the sub switching element Q2 based on the magnitude of a voltage generated in the quaternary winding L4. The second control circuit 6 includes two resistors R3 and R4 and a capacitor C4. A first end of the quaternary winding L4 is connected to the drain terminal of the main switching element Q1 and the source terminal of the sub switching element Q2. A second end of the quaternary winding L4 is connected to the drain terminal of the main switching element Q1 and the source terminal of the sub switching element Q2 via a series circuit of the resistor R3, the capacitor C4, and the resistor R4. The connection point of the capacitor C4 and the resistor R4 is connected to the gate terminal of the sub switching element Q2. Accordingly, it becomes possible for the second control circuit 6 to turn on and off the sub switching element Q2 in coordination with the turning on and off of the main switching element Q1 by the first control circuit 5. That is to say, the second control circuit 6 is configured to turn on and off the sub switching element Q2 in coordination with the turning on and off of the main switching element Q1 by the first control circuit 5.

The first control circuit 5 includes a first control unit 12 and a second control unit 13. The first control unit 12 is configured to control the turning on and off of the main switching element Q1. A first control IC or the like can be used as the first control unit 12, for example. The second control unit 13 is configured to control the first control unit 12. A microcomputer or the like can be used as the second control unit 13, for example.

The first control unit 12 is connected to the gate terminal of the main switching element Q1. Also, the first control unit 12 is connected to the source terminal of the main switching element Q1. Furthermore, the first control unit 12 is connected to the low potential side of the capacitor C2 via the series circuit of the resistor R5 and the resistor R6. In short, the first control unit 12 is configured to receive the first detection signal.

The second control unit 13 is connected to the anode of the diode D2. Also, the second control unit 13 is connected to the connection point of the resistor R7 and the resistor R8. Furthermore, the second control unit 13 is connected to the connection point of the phase control circuit 11 and the power supply unit 1. In short, the second control unit 13 is configured to receive the third detection signal and the power supply information signal.

The second control unit 13 is configured to, upon receiving the power supply information signal, generate the first control signal for controlling the first control unit 12 based on the power supply information (phase, in the present embodiment) of the power supply information signal. A first PWM (Pulse Width Modulation) signal or the like can be used as the first control signal, for example. The second control unit 13 includes a first storage unit. The first storage unit stores a first data table in which the power supply information of the power supply information signal is associated with a first duty ratio of the first control signal. The second control unit 13 is configured to generate the first control signal having the first duty ratio corresponding to the power supply information of the power supply information signal, according to the first data table.

Also, the second control unit 13 is configured to output the first control signal to the first control unit 12. In short, the second control unit 13 is configured to output, to the first control unit 12, the first control signal for controlling the first control unit 12 based on the power supply information of the power supply information signal.

The first control unit 12 is configured to control the turning on and off of the main switching element Q1 based on the first duty ratio of the first control signal outputted from the second control unit 13 and the magnitude of the first detection signal. In one example, the first control unit 12 is configured to control the turning on and off of the main switching element Q1 such that the output current I1 of the conversion unit 2 is changed (the magnitude of the first detection signal is changed) in accordance with the first duty ratio of the first control signal outputted from the second control unit 13. Accordingly, the power supply device 10 can perform light modulation of the light source unit 23, for example, and can suppress fluctuation of the output current I1 of the conversion unit 2. Thus, the power supply device 10 can perform light modulation of the light source unit 23, and can suppress flickering of light that is emitted from the light source unit 23.

The second control unit 13 is configured to, when the magnitude of the third detection signal is a preset threshold value or more, stop the turning on and off of the main switching element Q1 by the first control unit 12, or stop operation of the conversion unit 2. Accordingly, the power supply device 10 can, when a lightning surge is applied to the input voltage of the power supply unit 1, for example, suppress an over current from flowing in the light source unit 23. Note that, the threshold value is stored in advance in the first storage unit of the second control unit 13.

The power supply device 10 includes a receiver 15. The receiver 15 can receive a wireless signal from a wireless remote controller 24, for example. Examples of the wireless signal include an infrared signal and a radio signal. In the power supply device 10, a light modulation signal (second light modulation signal) is superimposed on the wireless signal. The second light modulation signal is a signal for instructing turning on, turning off, or performing light modulation of the solid-state light emitting elements 22. A second PWM signal can be used as the second light modulation signal, for example.

The receiver 15 is electrically connected to the second control unit 13. Also, the receiver 15 is configured to, upon receiving the wireless signal from the remote controller 24, output the second light modulation signal that is superimposed on the wireless signal to the second control unit 13. In short, the second control unit 13 is configured to receive the second light modulation signal for instructing the light modulation level of the solid-state light emitting elements 22.

The second control unit 13 is configured to, upon receiving the second light modulation signal from the receiver 15, generate the second control signal for controlling the first control unit 12 based on a second duty ratio of the second light modulation signal. A third PWM signal can be used as the second control signal, for example. The first storage unit of the second control unit 13 stores a second data table in which the second duty ratio of the second light modulation signal is associated with the third duty ratio of the second control signal. The second control unit 13 generates the second control signal having the third duty ratio corresponding to the second duty ratio of the second light modulation signal according to the second data table.

Also, the second control unit 13 is configured to output the second control signal to the first control unit 12. In short, the second control unit 13 is configured to output, to the first control unit 12, the second control signal for controlling the first control unit 12 based on the second duty ratio of the second light modulation signal.

The first control unit 12 is configured to control the turning on and off of the main switching element Q1 based on the third duty ratio of the second control signal outputted from the second control unit 13 and the magnitude of the first detection signal. In other words, the first control unit 12 further includes a function for controlling the turning on and off of the main switching element Q1 based on the third duty ratio of the second control signal outputted from the second control unit 13 and the magnitude of the first detection signal. In one example, the first control unit 12 is configured to, upon receiving the second control signal from the second control unit 13, control the turning on and off of the main switching element Q1 such that the output current I1 of the conversion unit 2 is changed (the magnitude of the first detection signal is changed) in accordance with the third duty ratio of the second control signal. Accordingly, the power supply device 10 can perform light modulation of the light source unit 23, for example, and can suppress the fluctuation of the output current I1 of the conversion unit 2. Thus, the power supply device 10 can perform light modulation of the light source unit 23, and can suppress flickering of light that is emitted from the light source unit 23. Note that, although the power supply device 10 includes the receiver 15, the configuration is not particularly limited thereto. The power supply device 10 may not include the receiver 15.

The first control circuit 5 includes a third control unit 14. The third control unit 14 is configured to output an adjusting signal for adjusting the magnitude of the output current I1 of the conversion unit 2. A second control IC or the like can be used as the third control unit 14, for example. The third control unit 14 is configured to output the adjusting signal based on the power supply information of the power supply information signal that was inputted to the second control unit 13. The third control unit 14 is electrically connected to the second control unit 13. The second control unit 13 is configured to, upon receiving the power supply information signal, output the power supply information signal to the third control unit 14. The third control unit 14 includes a second storage unit. The second storage unit stores a third data table in which the power supply information (phase, in the present embodiment) of the power supply information signal is associated with the magnitude of the adjusting signal. The third control unit 14 is configured to output the adjusting signal corresponding to the power supply information of the power supply information signal according to the third data table. In one example, the third control unit 14 is configured to output the adjusting signal for adjusting the magnitude of the output current I1 of the conversion unit 2 in accordance with the power supply information of the power supply information signal.

The first control unit 12 is configured to receive a fourth detection signal including the first detection signal and the adjusting signal. The third control unit 14 is connected to the resistor R6 via a resistor R9. Also, the third control unit 14 is connected to the first control unit 12 via the resistor R9. In the power supply device 10, the fourth detection signal is constituted by a signal in which the adjusting signal is superimposed on the first detection signal.

The first control unit 12 is configured to control the turning on and off of the main switching element Q1 based on the magnitude of the fourth detection signal. In other words, the first control unit 12 further includes a function for controlling the turning on and off of the main switching element Q1 based on the magnitude of the fourth detection signal. Accordingly, in the power supply device 10, the output current I1 of the conversion unit 2 can be changed arbitrarily.

Incidentally, the capacitance of the resonance capacitor C1 and the inductance of the resonance inductor L5 are each set such that, when the main switching element Q1 is in an off state and the sub switching element Q2 is in an on state, a waveform A1 of a voltage (second voltage) V2 that is generated between the drain terminal and the source terminal of the main switching element Q1 takes a protruding curve shape (refer to FIG. 2), the voltage V2 being generated due to a resonance phenomenon of at least the resonance capacitor C1, the primary winding L1, and the resonance inductor L5. The capacitance of the resonance capacitor C1 is set such that a resonance voltage is generated in the primary winding L1 of the transformer T1 due to a resonance phenomenon of the resonance capacitor C1 and an equivalent inductance of the primary winding L1 and resonance inductor L5. Accordingly, in the power supply device 10, a resonance voltage can be generated in the primary winding L1 of the transformer T1 when the main switching element Q1 is in an off state and the sub switching element Q2 is in an on state, and the output voltage V1 of the conversion unit 2 can be boosted. Thus, in the power supply device 10, the winding number of the secondary winding L2 of the transformer T1 can be reduced, and the transformer T1 can be downsized. Therefore, the power supply device 10 can be downsized. Note that the capacitance of the resonance capacitor C1 is set such that the resonance voltage is generated in the primary winding L1 of the transformer T1 due to a resonance phenomenon of the resonance capacitor C1 and the equivalent inductance of the primary winding L1 and resonance inductor L5, but the capacitance of the resonance capacitor C1 can be set differently. The capacitance of the resonance capacitor C1 may be set such that a resonance voltage is generated in the primary winding L1 of the transformer T1 due to a resonance phenomenon of the resonance capacitor C1 and an equivalent inductance of the primary winding L1, resonance inductor L5, secondary winding L2, and leakage inductance of the transformer T1, for example. The waveform A1 of the voltage V2 of the main switching element Q1 takes a protruding curve shape when the main switching element Q1 is in an off state and the sub switching element Q2 is in an on state. In other words, in the period S2 (refer to FIG. 2), the waveform A1 of the voltage V2 of the main switching element Q1 takes a waveform in which the voltage value of the voltage V2 gradually increases according to the elapse of time and then gradually decreases according to the elapse of time after reaching a peak value of the voltage V2. That is to say, the voltage value of the voltage V2 is larger at an intermediate point (time t5 in FIG. 2, for example) in the period S2 than at the start point of the period S2 (time t3 in FIG. 2, for example) or at the end point (time t4 in FIG. 2, for example).

In the power supply device 10, a waveform A2 of a current I3 flowing in the sub switching element Q2 takes an S shape (refer to FIG. 2) when the main switching element Q1 is in an off state and the sub switching element Q2 is in an on state. That is, the capacitance of the resonance capacitor C1 and the inductance of the resonance inductor L5 are each set such that the waveform A2 of the current I3 flowing in the sub switching element Q2 takes an S shape when the main switching element Q1 is in an off state and the sub switching element Q2 is in an on state. The waveform A2 of the current I3 flowing in the sub switching element Q2 takes an S shape when the main switching element Q1 is in an off state and the sub switching element Q2 is in an on state. In other words, in the period S2, the waveform A2 of the current I3 flowing in the sub switching element Q2 takes a waveform in which the current value of the current I3 flowing in the sub switching element Q2 gradually changes from a negative maximum value to a positive maximum value according to the elapse of time. That is to say, the current value of the current I3 is the negative maximum value at the start point (time t2 in FIG. 2, for example) of the period S2. The current value of the current I3 gradually increases from the negative maximum value and becomes zero at the intermediate point (time t5 in FIG. 2, for example). Then, the current value of the current I3 gradually increases from zero and becomes the positive maximum value at the end point (time t4 in FIG. 2, for example).

Also, the capacitance of the resonance capacitor C1 and the inductance of the resonance inductor L5 are each set such that, when the main switching element Q1 is in an off state and the sub switching element Q2 is in an on state, the peak value of the voltage V2 of the main switching element Q1 is greater than or equal to the output level V3 of the power supply unit 1 and less than the breakdown voltage of the main switching element Q1. Accordingly, in the power supply device 10, a switching element having a relatively low breakdown voltage can be selected as the main switching element Q1, and the output voltage V1 of the conversion unit 2 can be boosted. Thus, downsizing and cost reduction of the power supply device 10 can be realized.

Hereinafter, operations of the power supply device 10 according to the present embodiment will be described with reference to FIGS. 1 and 2. Note that, in the following, description will be given assuming that electric power is supplied to the power supply device 10 from a commercial power supply 25. FIG. 2 shows a voltage V4 across the resonance capacitor C1, a voltage V5 between the gate and source of the sub switching element Q2, and a voltage V6 between the drain and source of the sub switching element Q2.

When the main switching element Q1 shifts from an off state to an on state (time t1, in FIG. 2) in the power supply device 10, the current I2 flows in the main switching element Q1 via the primary winding L1 of the transformer T1. Accordingly, in the power supply device 10, magnetic energy is accumulated in the primary winding L1.

Also, when the main switching element Q1 shifts from an on state to an off state (time t2, in FIG. 2) in the power supply device 10, a counter-electromotive force is generated in the primary winding L1. Accordingly, in the power supply device 10, the capacitor 8 is charged, and the voltage V2 of the main switching element Q1 increases (period from time t2 to time t3, in FIG. 2). Also, when the capacitor 8 is charged (period from time t3 to time t4, in FIG. 2) in the power supply device 10, current flows in the diode 9 and the resonance capacitor C1 is reverse-charged.

Figure 2:
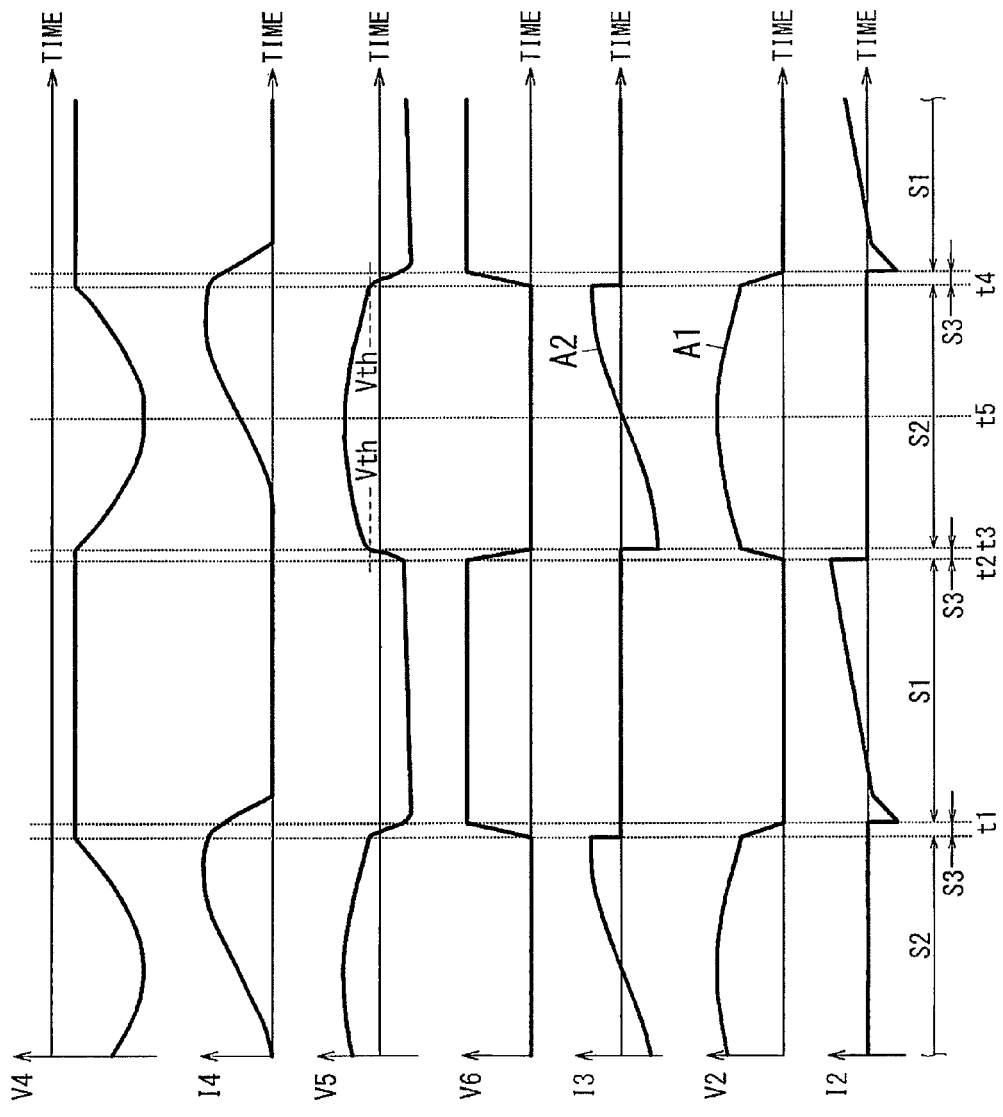
FIG. 2 is a timing chart illustrating operations of the power supply device according to Embodiment 1.

Also, when the resonance capacitor C1 is reverse-charged in the power supply device 10, the sub switching element Q2 shifts from an off state to an on state if an induced voltage (voltage V5 between the gate and source of the sub switching element Q2) generated in the quaternary winding L4 of the transformer T1 becomes a gate threshold voltage Vth of the sub switching element Q2 or more (time t3, in FIG. 2). Accordingly, in the power supply device 10, the current I3 flows in the sub switching element Q2 from the primary winding L1 via the resonance capacitor C1, and the waveform A1 of the voltage V2 of the main switching element Q1 takes a protruding curve shape. Thus, in the power supply device 10, the voltage V2 of the main switching element Q1 can be suppressed from increasing rapidly, and it is possible to suppress dielectric breakdown of the main switching element Q1. Also, in the power supply device 10, the waveform A2 of the current I3 flowing in the sub switching element Q2 takes an S shape, when the main switching element Q1 is in an off state and the sub switching element Q2 is in an on state.

Also, when the main switching element Q1 is in an off state and the sub switching element Q2 is in an on state (period from time t3 to time t4, in FIG. 2) in the power supply device 10, the resonance voltage is generated in the primary winding L1 of the transformer T1 due to a resonance phenomenon of at least the resonance capacitor C1, the primary winding L1, and the resonance inductor L5. Also, when the main switching element Q1 is in an off state and the sub switching element Q2 is in an on state in the power supply device 10, the resonance voltage generated in the primary winding L1 is transmitted to the secondary winding L2. Accordingly, in the power supply device 10, a current I4 flows in the resonance inductor L5, and the capacitor C2 is charged. Thus, in the power supply device 10, the light source unit 23 can be operated when the voltage across the capacitor C2 becomes the sum of the forward voltages of the respective solid-state light emitting elements 22 or more.

Also, when the induced voltage generated in the quaternary winding L4 of the transformer T1 becomes less than the gate threshold voltage Vth of the sub switching element Q2 (time t4, in FIG. 2) in the power supply device 10, the sub switching element Q2 shifts from an on state to an off state. Accordingly, in the power supply device 10, charge accumulated in the resonance capacitor C1 is discharged to ground via the power supply unit 1. Also, in the power supply device 10, charge accumulated in the capacitor 8 is discharged to ground via a path of the primary winding L1 and the power supply unit 1.

Figure 3:
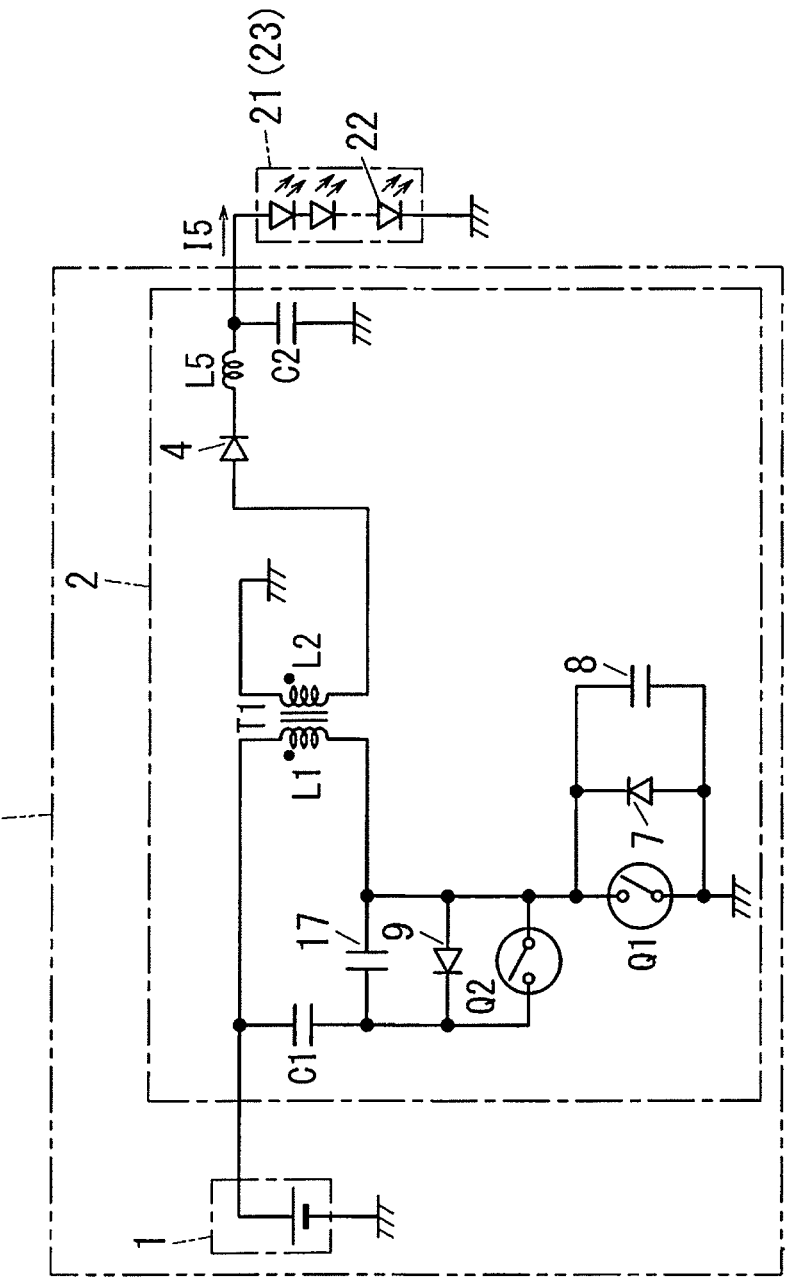
FIG. 3 is a circuit diagram of a simulation model of the power supply device according to Embodiment 1.

Incidentally, as shown in FIG. 3, the inventors conceived a power supply device 16, which is a simulation model of the power supply device 10 according to the present embodiment. The power supply unit 1 is a DC power supply that outputs a fixed DC voltage. Note that, in the power supply device 16, constituent elements similar to those of the power supply device 10 are provided with the same reference numerals, and description thereof will be omitted as appropriate. A capacitor 17 in FIG. 3 represents a parasitic capacitor in the sub switching element Q2. Also, the graphic symbol of the switching elements Q1 and Q2 in FIG. 3 represents MOSFET in a simplified manner.

In the power supply device 16, the output voltage of the power supply unit 1 is set to 140 V, the switching frequency of the main switching element Q1 is set to 200 kHz, and the switching frequency of the sub switching element Q2 is set to 200 kHz, but the values of these parameters are not specifically limited. The duty ratios of the switching elements Q1 and Q2 are each set to 38%, as an example.

Also, the inventors performed simulations by changing the capacitance of the resonance capacitor C1 in the power supply device 16, with the constants of circuit components other than the resonance capacitor C1 being fixed. Note that the inventors used a circuit simulator or the like when the simulation was performed on the power supply device 16, for example.

Figure 4:
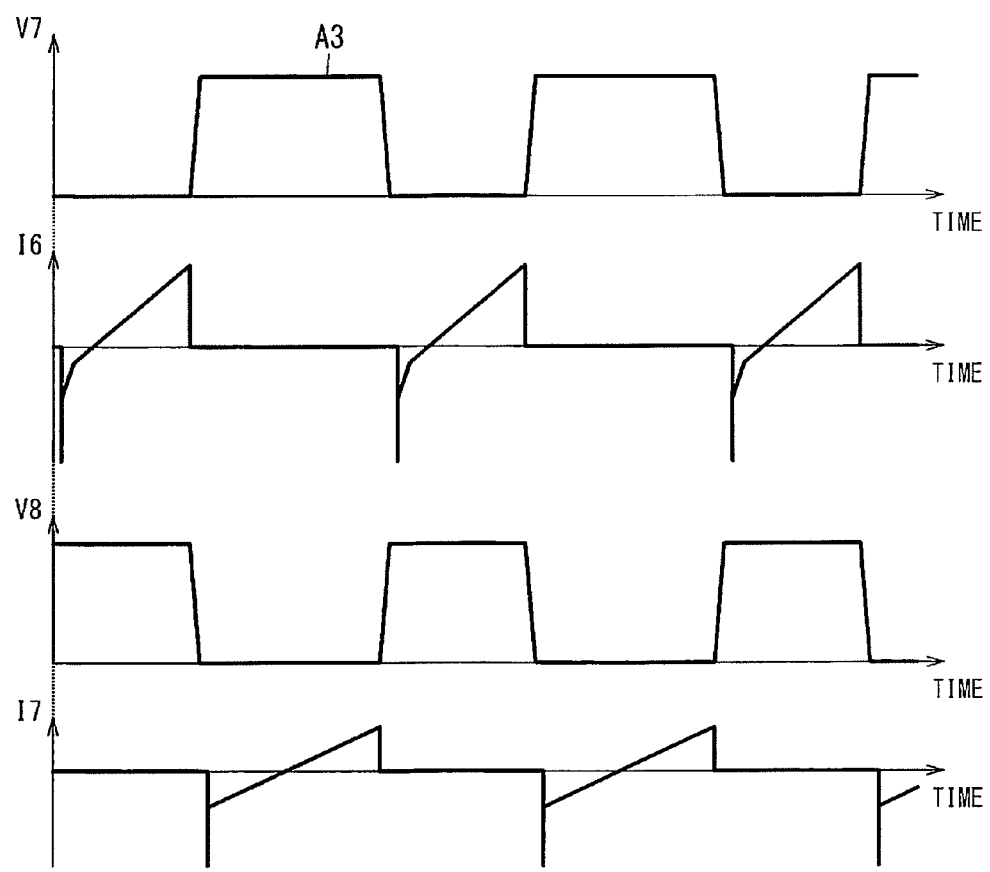
FIG. 4 is a timing chart, which is a result of simulation performed using the simulation model, illustrating operations of the power supply device.

In the case where the capacitance of the resonance capacitor C1 was set to 100 nF in the power supply device 16, a waveform A3 of a voltage V7 between the drain and source of the main switching element Q1 was flat, as shown in FIG. 4, when the main switching element Q1 was in an off state and the sub switching element Q2 was in an on state. The peak value of the voltage V7 was 246.6 V. The average value of an output current I5 of the conversion unit 2 was 151.1 mA. FIG. 4 further shows a current I6 flowing in the main switching element Q1, a voltage V8 between the drain and source of the sub switching element Q2, and a current I7 flowing in the sub switching element Q2.

Figure 5:
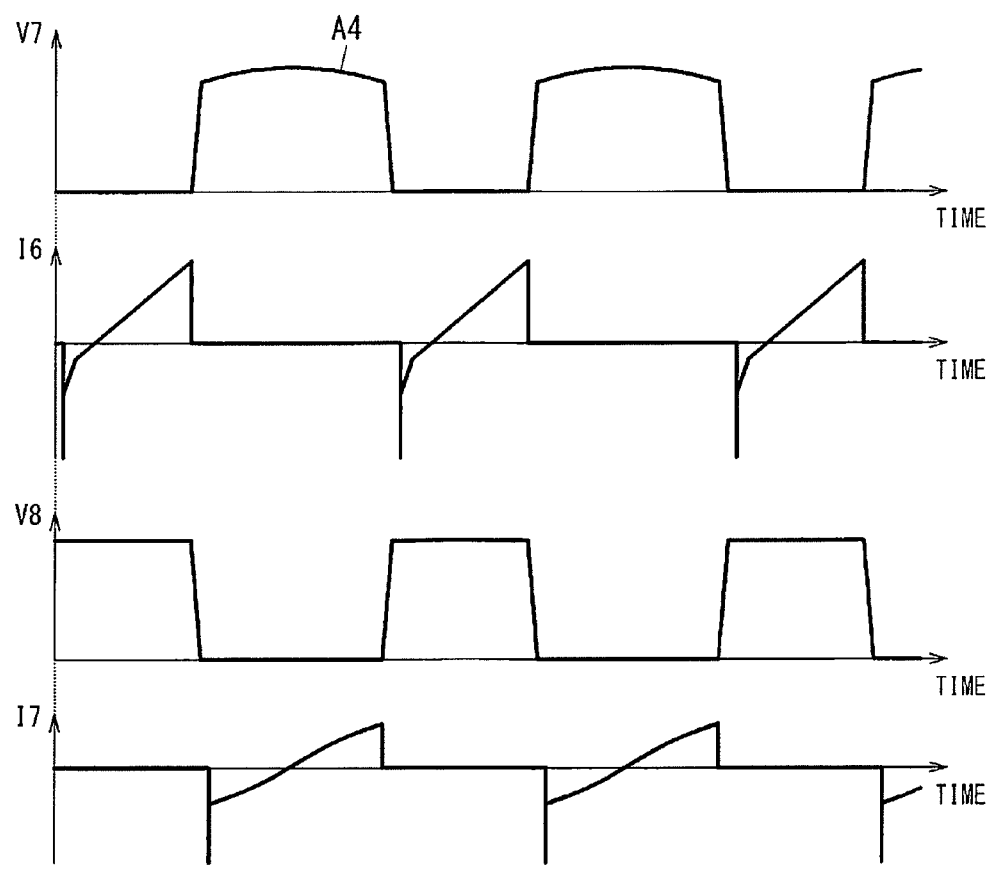
FIG. 5 is another timing chart, which is a result of simulation performed using the simulation model, illustrating operations of the power supply device.

Also, in the case where the capacitance of the resonance capacitor C1 was set to 10 nF in the power supply device 16, a waveform A4 of the voltage V7 between the drain and source of the main switching element Q1 took a protruding curve shape (hereinafter referred to as first protruding curve), as shown in FIG. 5, when the main switching element Q1 was in an off state and the sub switching element Q2 was in an on state. The peak value of the voltage V7 was 257.1 V. The average value of the output current I5 of the conversion unit 2 was 149.8 mA. FIG. 5 further shows the current I6 flowing in the main switching element Q1, the voltage V8 between the drain and source of the sub switching element Q2, and the current I7 flowing in the sub switching element Q2.

Figure 6:
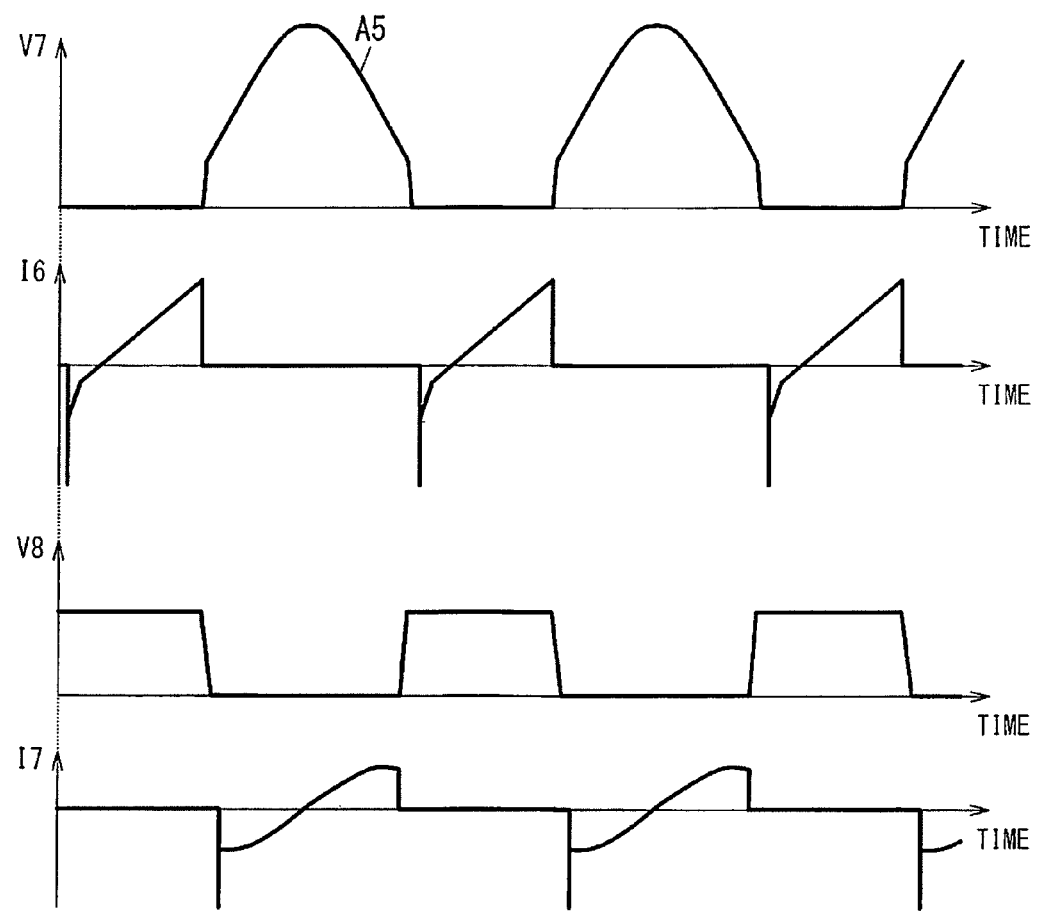
FIG. 6 is yet another timing chart, which is a result of simulation performed using the simulation model, illustrating operations of the power supply device.

Also, in the case where the capacitance of the resonance capacitor C1 was set to 1.5 nF in the power supply device 16, a waveform A5 of the voltage V7 between the drain and source of the main switching element Q1 took a protruding curve shape (hereinafter referred to as second protruding curve), as shown in FIG. 6, when the main switching element Q1 was in an off state and the sub switching element Q2 was in an on state. The curvature of the second protruding curve was larger than the curvature of the first protruding curve. The peak value of the voltage V7 was 426.1 V. The average value of the output current I5 of the conversion unit 2 was 151.6 mA. FIG. 6 further shows the current I6 flowing in the main switching element Q1, the voltage V8 between the drain and source of the sub switching element Q2, and the current I7 flowing in the sub switching element Q2.

Accordingly, in the cases where the capacitance of the resonance capacitor C1 is set to 10 nF and 1.5 nF in the power supply device 16, the waveform A4 and the waveform A5 of the voltage V7 take protruding curve shapes, and the peak values of the voltage V7 are larger than that in the case where the capacitance of the resonance capacitor C1 is set to 100 nF. Accordingly, in the power supply device 16, in the case where the capacitance of the resonance capacitor C1 is sufficiently smaller than the capacitance of the resonance capacitor C1 in the case where the waveform A3 of the voltage V7 is flat, the waveforms A4 and A5 of the voltage V7 can take protruding curve shapes, and the peak value of the voltage V7 can be made large. That is to say, in the power supply device 10, in the case where the capacitance of the resonance capacitor C1 is sufficiently smaller than the capacitance of the resonance capacitor C1 in the case where the waveform of the voltage V2 is flat, the waveform of the voltage V2 takes a protruding curve shape, and the peak value of the voltage V2 can be made large. The capacitance being sufficiently smaller than the capacitance of the resonance capacitor C1 in the case where the waveform of the voltage V2 is flat is preferably a capacitance in a range from 1/100 to 1/10 of the capacitance of the resonance capacitor C1 in the case where the waveform of the voltage V2 is flat, for example. Note that, in the following description, the capacitance of the resonance capacitor C1 being sufficiently smaller than the capacitance of the resonance capacitor C1 in the case where the waveform A3 of the voltage V7 is flat is simply referred to as "the capacitance of the resonance capacitor C1 being sufficiently small", for the sake of description.

Figure 7:
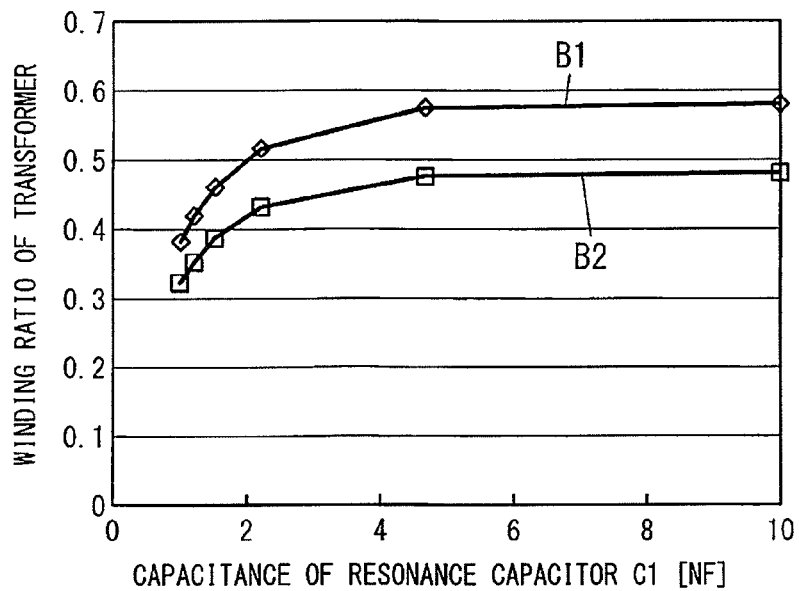
FIG. 7 is a correlation diagram between a winding ratio of a transformer and capacitance of a resonance capacitor with respect to a result of simulation performed using the simulation model of the power supply device.

FIG. 7 is an example of the simulation result performed on the power supply device 16, and shows a correlation diagram between the winding ratio of the transformer T1 and the capacitance of the resonance capacitor C1, in the cases where the average value of the output current I5 of the conversion unit 2 is set to 150 mA and 75 mA. The winding ratio of the transformer T1 is the ratio of the winding number of the secondary winding L2 relative to the winding number of the primary winding L1. The curve designated by B1 in FIG. 7 is a simulation result in the case where the average value of the output current I5 of the conversion unit 2 is 150 mA. Also, the curve designated by B2 in FIG. 7 is a simulation result in the case where the average value of the output current I5 of the conversion unit 2 is 75 mA.

The winding ratio of the transformer T1 was 0.58 when the capacitance of the resonance capacitor C1 was set to 10 nF and the average value of the output current I5 of the conversion unit 2 was 150 mA in the power supply device 16. The winding ratio of the transformer T1 was 0.575 when the capacitance of the resonance capacitor C1 was set to 4.7 nF and the average value of the output current I5 of the conversion unit 2 was 150 mA in the power supply device 16. The winding ratio of the transformer T1 was 0.518 when the capacitance of the resonance capacitor C1 was set to 2.2 nF and the average value of the output current I5 of the conversion unit 2 was 150 mA in the power supply device 16. The winding ratio of the transformer T1 was 0.462 when the capacitance of the resonance capacitor C1 was set to 1.5 nF and the average value of the output current I5 of the conversion unit 2 was 150 mA in the power supply device 16. The winding ratio of the transformer T1 was 0.42 when the capacitance of the resonance capacitor C1 was set to 1.2 nF and the average value of the output current I5 of the conversion unit 2 was 150 mA in the power supply device 16. The winding ratio of the transformer T1 was 0.382 when the capacitance of the resonance capacitor C1 was set to 1 nF and the average value of the output current I5 of the conversion unit 2 was 150 mA in the power supply device 16.

Also, the winding ratio of the transformer T1 was 0.479 when the capacitance of the resonance capacitor C1 was set to 10 nF and the average value of the output current I5 of the conversion unit 2 was 75 mA in the power supply device 16. The winding ratio of the transformer T1 was 0.472 when the capacitance of the resonance capacitor C1 was set to 4.7 nF and the average value of the output current I5 of the conversion unit 2 was 75 mA in the power supply device 16. The winding ratio of the transformer T1 was 0.43 when the capacitance of the resonance capacitor C1 was set to 2.2 nF and the average value of the output current I5 of the conversion unit 2 was 75 mA in the power supply device 16. The winding ratio of the transformer T1 was 0.385 when the capacitance of the resonance capacitor C1 was set to 1.5 nF and the average value of the output current I5 of the conversion unit 2 was 75 mA in the power supply device 16. The winding ratio of the transformer T1 was 0.352 when the capacitance of the resonance capacitor C1 was set to 1.2 nF and the average value of the output current I5 of the conversion unit 2 was 75 mA in the power supply device 16. The winding ratio of the transformer T1 was 0.32 when the capacitance of the resonance capacitor C1 was set to 1 nF and the average value of the output current I5 of the conversion unit 2 was 75 mA in the power supply device 16.

Accordingly, in the power supply device 16, the winding number of the secondary winding L2 of the transformer T1 can be reduced in the case where the winding number of the primary winding L1 of the transformer T1 is fixed and the capacitance of the resonance capacitor C1 is set to a value that is sufficiently small. That is to say, in the power supply device 10, the winding number of the secondary winding L2 of the transformer T1 can be reduced in the case where the winding number of the primary winding L1 of the transformer T1 is fixed and the capacitance of the resonance capacitor C1 is set to a value that is sufficiently small. Thus, in the power supply device 10, the transformer T1 can be downsized.

In the power supply device 10, in the case where the capacitance of the resonance capacitor C1 is set to a value that is sufficiently small, the waveform A1 of the voltage V2 of the main switching element Q1 takes a protruding curve shape, and the peak value of the voltage V2 can be increased. Also, in the power supply device 10, in the case where the capacitance of the resonance capacitor C1 is set to a value that is sufficiently small, the winding number of the secondary winding L2 of the transformer T1 can be reduced, and the transformer T1 can be downsized.

Figure 12:
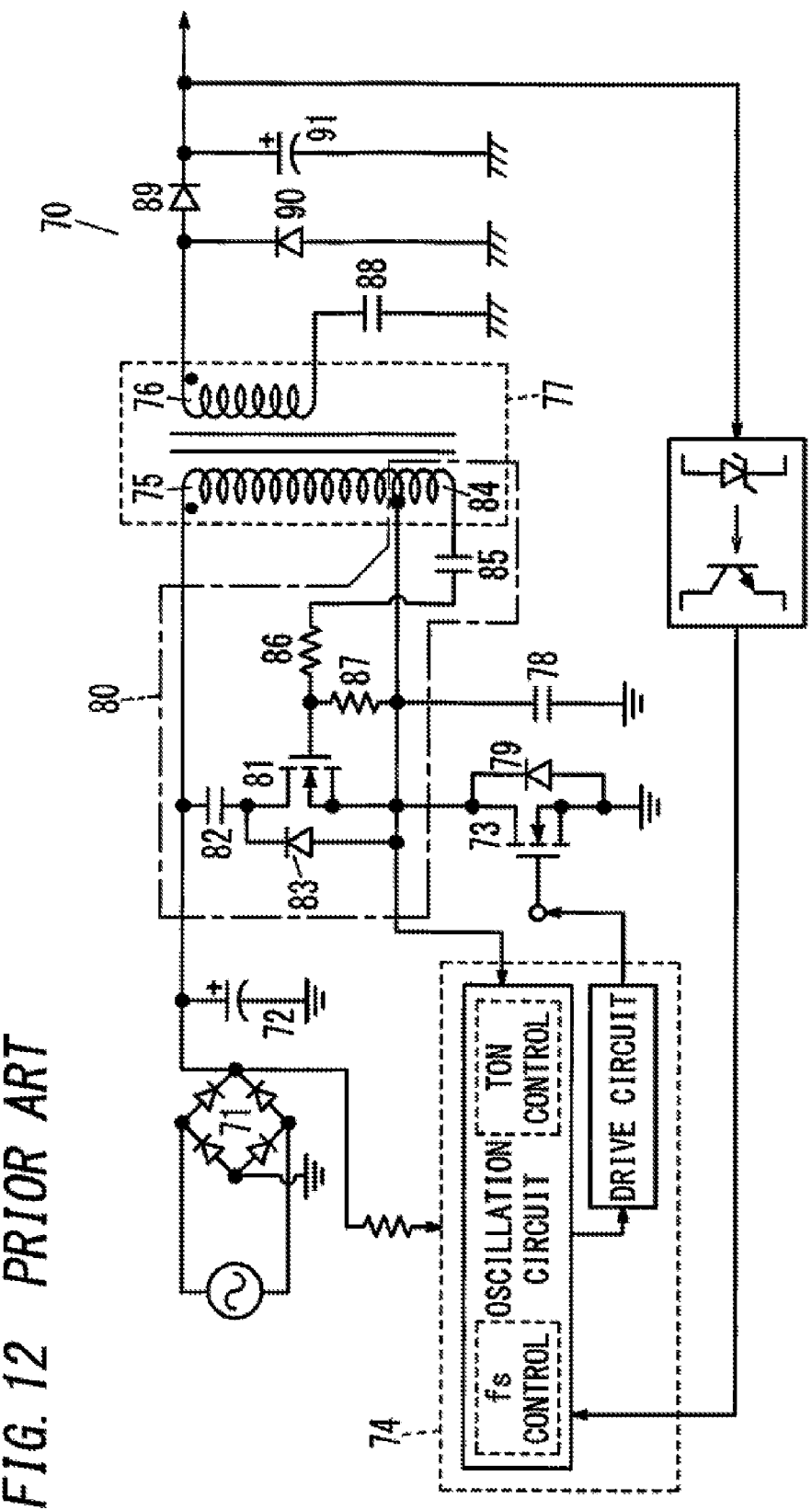
FIG. 12 is a circuit diagram of a power supply device serving as a comparative example.

Also, in the power supply device 10, the secondary winding L2 is connected in series to the series circuit of the rectifying element 4 and the resonance inductor L5. In the power supply device 10, the capacitance of the resonance capacitor C1 and the inductance of the resonance inductor L5 are each set such that, when the main switching element Q1 is in an off state and the sub switching element Q2 is in an on state, the waveform A1 of the voltage V2 of the main switching element Q1 takes a protruding curve shape, the voltage V2 being generated due to a resonance phenomenon of at least the resonance capacitor C1, the primary winding L1, and the resonance inductor L5. Accordingly, in the power supply device 10, a voltage doubler half-wave rectifying circuit in a power supply device 70 that includes a configuration shown in FIG. 12, which serves as a comparative example, is not needed, and further downsizing can be realized compared with the power supply device 70 serving as the comparative example.

The power supply device 10 according to the present embodiment as described above includes the power supply unit 1, the conversion unit 2, and the control unit 3. The power supply unit 1 is configured to generate the first DC voltage from an input voltage. The conversion unit 2 is configured to convert the first DC voltage outputted from the power supply unit 1 into the second DC voltage having a different voltage value. The control unit 3 is configured to control the conversion unit 2. The conversion unit 2 is an active clamp type flyback converter. The conversion unit 2 includes the main switching element Q1, the sub switching element Q2, the flyback transformer T1, and the rectifying element 4. The transformer T1 includes the primary winding L1 and the secondary winding L2. The rectifying element 4 is configured to half-wave rectify the first voltage generated in the secondary winding L2. The main switching element Q1 and the sub switching element Q2 each include the first main terminal, the second main terminal, and the control terminal. The primary winding L1 is connected in series to the main switching element Q1, and is connected in parallel to the series circuit of the resonance capacitor C1 and the sub switching element Q2. The secondary winding L2 is connected in series to the series circuit of the rectifying element 4 and the resonance inductor L5. The control unit 3 is configured to control the main switching element Q1 and the sub switching element Q2. The control unit 3 includes a first control mode, the second control mode, and the third control mode, as the control modes. The first control mode is a mode in which the main switching element Q1 is put in an on state, and the sub switching element Q2 is put in an off state. The second control mode is a mode in which the main switching element Q1 is put in an off state, and the sub switching element Q2 is put in an on state. The third control mode is a mode in which the main switching element Q1 and the sub switching element Q2 are both put in the off state. The control unit 3 is configured to alternate between the first control mode and the second control mode via the third control mode. The capacitance of the resonance capacitor C1 and the inductance of the resonance inductor L5 are each set such that, in the period S2 in which the main switching element Q1 is in an off state and the sub switching element Q2 is in an on state, the waveform A1, with respect to time in the period S2, of the voltage V2 that is generated between the first main terminal (drain terminal) and the second main terminal (source terminal) of the main switching element Q1 takes a protruding curve shape, the second voltage (voltage V2) being generated due to a resonance phenomenon of at least the resonance capacitor C1, the primary winding L1, and the resonance inductor L5.

Accordingly, in the power supply device 10, when the main switching element Q1 is in an off state, and the sub switching element Q2 is in an on state, a resonance voltage can be generated in the primary winding L1 of the transformer T1 and the output voltage V1 of the conversion unit 2 can be boosted. Thus, in the power supply device 10, the winding number of the secondary winding L2 of the transformer T1 can be reduced, and the transformer T1 can be downsized, and further downsizing of the power supply device 10 can be realized compared with the power supply device 70 serving as the comparative example. Also, in the power supply device 10, a switching element having a relatively low breakdown voltage can be selected as the main switching element Q1, and the transformer T1 can be downsized.

In other words, in the power supply device 10, the capacitance of the resonance capacitor C1 and the inductance of the resonance inductor L5 are each set such that, when the main switching element Q1 is in an off state and the sub switching element Q2 is in an on state, the waveform A1 of the voltage V2 that is generated between the first main terminal and the second main terminal of the main switching element Q1 takes a protruding curve shape, the voltage V2 being generated due to a resonance phenomenon of at least the resonance capacitor C1, the primary winding L1, and the resonance inductor L5. Accordingly, in the power supply device 10, when the main switching element Q1 is in an off state, and the sub switching element Q2 is in an on state, a resonance voltage can be generated in the primary winding L1 of the transformer T1 and the output voltage V1 of the conversion unit 2 can be boosted. Accordingly, in the power supply device 10, the winding number of the secondary winding L2 of the transformer T1 can be reduced, and the transformer T1 can be downsized. Thus, the power supply device 10 can be further downsized.

Also, in the power supply device 10, the control unit 3 is configured to alternate between the first control mode and the second control mode via the third control mode. Accordingly, in the power supply device 10, soft switching of the switching elements Q1 and Q2 can be performed. Accordingly, in the power supply device 10, switching losses of the switching elements Q1 and Q2 can be suppressed. Also, in the power supply device 10, since the soft switching of the switching elements Q1 and Q2 can be performed, the generation of noise can be suppressed. Thus, in the power supply device 10, a noise filter or the like is not needed, for example, and further downsizing can be realized.

Also, in the power supply device 10, when the main switching element Q1 is in an off state and the sub switching element Q2 is in an on state, the waveform A1 of the voltage V2 that is generated between the first main terminal and the second main terminal of the main switching element Q1 takes a protruding curve shape, the voltage V2 being generated due to a resonance phenomenon of at least the resonance capacitor C1, the primary winding L1, and the resonance inductor L5. Accordingly, in the power supply device 10, a harmonic component of the voltage V2 that is generated between the first main terminal and the second main terminal of the main switching element Q1 can be suppressed, and generation of noise can be suppressed. Thus, in the power supply device 10, a noise filter or the like is not needed, for example, and further downsizing can be realized.

Also, in the power supply device 10, the secondary winding L2 is connected in series to the series circuit of the rectifying element 4 and the resonance inductor L5. Accordingly, in the power supply device 10, the current I4 flowing in the resonance inductor L5 can be made constant, for example, and flickering of light emitted from the light source unit 23 can be suppressed.

The capacitance of the resonance capacitor C1 and the inductance of the resonance inductor L5 are each set such that, in the period S2 in which the main switching element Q1 is in an off state and the sub switching element Q2 is in an on state, the waveform A2, with respect to time in the period S2, of the current I3 flowing in the sub switching element Q2 takes an S shape. Accordingly, in the power supply device 10, a switching element having a relatively low breakdown voltage can be selected as the main switching element Q1, and the transformer T1 can be downsized.

The capacitance of the resonance capacitor C1 and the inductance of the resonance inductor L5 are each set such that, when the main switching element Q1 is in an off state and the sub switching element Q2 is in an on state, the peak value of the second voltage (voltage V2) that is generated between the first main terminal and the second main terminal of the main switching element Q1 is greater than or equal to the output level V3 of the power supply unit 1 and less than the breakdown voltage of the main switching element Q1. Accordingly, in the power supply device 10, it is possible to suppress the case where the peak value of the voltage V2 of the main switching element Q1 becomes the breakdown voltage of the main switching element Q1 or more.

The control unit 3 is configured to control the conversion unit 2 such that the output current I1 of the conversion unit 2 is made constant. Accordingly, in the power supply device 10, fluctuation of the output current I1 of the conversion unit 2 can be suppressed. Thus, in the case where the power supply device 10 supplies electric power to the light source unit 23, for example, flickering of light emitted from the light source unit 23 can be suppressed.

It is preferable that the coupling coefficient of the transformer T1 is in a range of 0.9 to 1 inclusive. Accordingly, in the power supply device 10, further downsizing of the transformer T1 can be realized compared with the case in which the coupling coefficient of the transformer T1 is less than 0.9.

The control unit 3 includes the first control circuit 5 and the second control circuit 6. The first control circuit 5 is configured to control the main switching element Q1. The second control circuit 6 is configured to control the sub switching element Q2. The tertiary winding L3 and the quaternary winding L4 are provided on the primary side of the transformer T1. The tertiary winding L3 and the quaternary winding L4 are magnetically coupled to the primary winding L1. The first control circuit 5 employs a voltage generated in the tertiary winding L3 as an operation power supply. The first control circuit 5 is configured to control the main switching element Q1 based on the magnitude of the output current I1 of the conversion unit 2. The second control circuit 6 is configured to control the sub switching element Q2 based on the magnitude of the voltage generated in the quaternary winding L4.

Accordingly, in the power supply device 10, the first control circuit 5 can control the main switching element Q1 according to the output current I1 of the conversion unit 2. Also, in the power supply device 10, the second control circuit 6 can control the sub switching element Q2 according to current flowing in the primary winding L1.

The second control circuit 6 is a self-excited type control circuit. The second control circuit 6 is configured to turn on and off the sub switching element Q2 in coordination with the turning on and off of the main switching element Q1 by the first control circuit 5. Accordingly, the power supply device 10 can be downsized compared with a case where the second control circuit 6 is a separately excited type control circuit.

The first control circuit 5 is configured to receive the first detection signal, the second detection signal, and the power supply information signal. The first detection signal corresponds to the output current I1 of the conversion unit 2. The second detection signal corresponds to the current I2 flowing in the main switching element Q1. The power supply information signal includes power supply information. The power supply information includes at least one of a waveform of the input voltage of the power supply unit 1, an amplitude in the waveform of the input voltage, and a phase in the waveform of the input voltage.

Accordingly, the first control circuit 5 can control the main switching element Q1 such that the output current I1 of the conversion unit 2 is changed, for example, based on at least one of the first detection signal, the second detection signal, and the power supply information signal.

The first control circuit 5 is configured to receive the third detection signal corresponding to the output voltage V1 of the conversion unit 2. The third detection signal corresponds to the output voltage V1 of the conversion unit 2. The first control circuit 5 is configured to control the main switching element Q1 based on the magnitude of the third detection signal. Accordingly, the first control circuit 5 can suppress an over-voltage from being applied to the light source unit 23, for example.

The phase control circuit 11 is electrically connected to the input side of the power supply unit 1. The phase control circuit 11 performs phase control on the sine wave-like AC voltage. The power supply unit 1 is configured to generate the first DC voltage from the voltage on which phase control is performed by the phase control circuit 11 as the input voltage. Accordingly, the power supply device 10 can use the voltage on which phase control is performed by the phase control circuit 11 as the operation power supply.

The phase control circuit 11 is configured to perform light modulation of the solid-state light emitting element 22 that is to be electrically connected to the output side of the conversion unit 2. Accordingly, the power supply device 10 can perform light modulation of the solid-state light emitting elements 22 in the case where the light source unit 23 is connected to the output side of the conversion unit 2, for example.

The first control circuit 5 is configured to receive the power supply information signal. The power supply information signal includes the power supply information. The power supply information includes at least one of the waveform of the input voltage of the power supply unit 1, the amplitude in the waveform of the input voltage, and the phase in the waveform of the input voltage. The power supply information signal is the first light modulation signal for instructing the light modulation level of the solid-state light emitting element 22, and is constituted by the waveform of the voltage on which phase control was performed by the phase control circuit 11. Accordingly, in the case where the light source unit 23 is connected to the output side of the conversion unit 2, for example, the first control circuit 5 can perform light modulation of the solid-state light emitting elements 22 by controlling the main switching element Q1 based on the power supply information (phase) of the power supply information signal.

The first control circuit 5 includes the first control unit 12 and the second control unit 13. The first control unit 12 is configured to control the turning on and off of the main switching element Q1. The second control unit 13 is configured to control the first control unit 12. The first control unit 12 is configured to receive the first detection signal. The first detection signal corresponds to the output current I1 of the conversion unit 2. The second control unit 13 is configured to receive the power supply information signal, and to output the first control signal for controlling the first control unit 12 based on the power supply information of the power supply information signal to the first control unit 12. The power supply information signal includes the power supply information. The power supply information includes at least one of the waveform of the input voltage of the power supply unit 1, the amplitude in the waveform of the input voltage, and the phase in the waveform of the input voltage. The first control signal is the first PWM signal. The first control unit 12 is configured to control the turning on and off of the main switching element Q1 based on the first duty ratio of the first control signal outputted from the second control unit 13 and the magnitude of the first detection signal.

Accordingly, the first control unit 12 can control the turning on and off of the main switching element Q1 based on the first duty ratio of the first control signal and the magnitude of the first detection signal. Thus, the power supply device 10 can perform light modulation of the light source unit 23 based on the power supply information (phase) of the power supply information signal outputted from the light modulator that is used as the phase control circuit 11, for example.

The second control unit 13 is configured to receive the third detection signal. The third detection signal corresponds to the output voltage V1 of the conversion unit 2. The second control unit 13 is configured to, when the magnitude of the third detection signal is the predetermined threshold value or more, stop the turning on and off of the main switching element Q1 by the first control unit 12, or stop the operation of the conversion unit 2. Accordingly, the power supply device 10 can suppress an over current from flowing in the light source unit 23, for example.

The second control unit 13 is configured to receive the second light modulation signal for instructing the light modulation level of the solid-state light emitting element 22 that is to be electrically connected to the output side of the conversion unit 2. The second light modulation signal is the second PWM signal. The second control unit 13 is configured to output the second control signal for controlling the first control unit 12 based on the second duty ratio of the second light modulation signal to the first control unit 12. The second control signal is the third PWM signal. The first control unit 12 further includes the function for controlling the turning on and off of the main switching element Q1 based on the third duty ratio of the second control signal outputted from the second control unit 13 and the magnitude of the first detection signal.

Accordingly, the first control unit 12 can control the turning on and off of the main switching element Q1 based on the third duty ratio of the second control signal and the magnitude of the first detection signal. Thus, the power supply device 10 can perform light modulation of the light source unit 23 based on the second duty ratio of the second light modulation signal that is superimposed on the wireless signal described above from the remote controller 24, for example.

The first control circuit 5 includes the third control unit 14. The third control unit 14 is configured to output the adjusting signal for adjusting the magnitude of the output current I1 of the conversion unit 2 based on the power supply information of the power supply information signal that was inputted to the second control unit 13. The first control unit 12 is configured to receive the fourth detection signal that includes the first detection signal and the adjusting signal. The first control unit 12 further includes the function for controlling the turning on and off of the main switching element Q1 based on the magnitude of the fourth detection signal. Accordingly, in the power supply device 10, the output current I1 of the conversion unit 2 can be arbitrarily changed.

Figure 8:
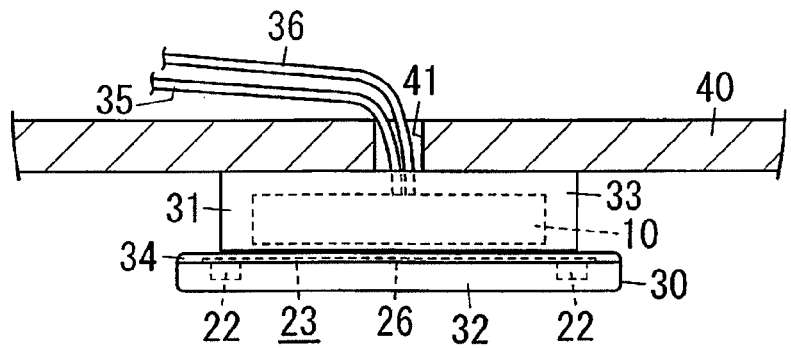
FIG. 8 is a schematic side view of a lighting apparatus according to Embodiment 1 in an installed state.
Figure 9:
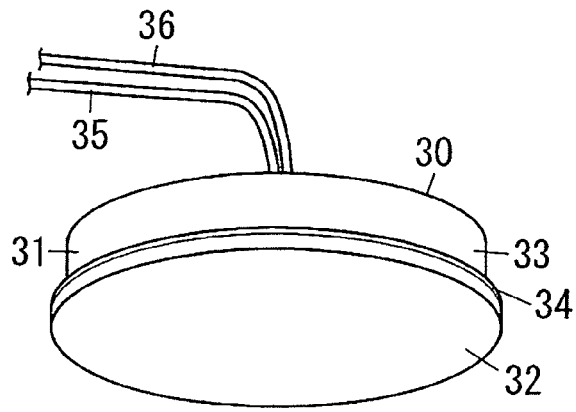
FIG. 9 is a schematic perspective view of the lighting apparatus according to Embodiment 1.

Hereinafter, an example of a lighting apparatus 30 including the power supply device 10 according to the present embodiment will be briefly described with reference to FIGS. 8 and 9.

The lighting apparatus 30 is configured to be attached directly to a ceiling member 40, for example. The lighting apparatus 30 includes the power supply device 10 and the light source unit 23 including the two or more solid-state light emitting elements 22 that can be turned on by the power supply device 10.

The light source unit 23 includes the solid-state light emitting elements 22 and a mounting substrate 26. A printed wiring board or the like can be used as the mounting substrate 26, for example. The solid-state light emitting elements 22 are mounted on a first face side (lower face side, in FIG. 8) of the mounting substrate 26. The solid-state light emitting elements 22 are arranged at equal intervals on a circumference of a virtual circle on the first face of the mounting substrate 26. The mounting substrate 26 is electrically connected to the power supply device 10 via a pair of first connection lines. Note that the solid-state light emitting elements 22 and the mounting substrate 26 are not shown in FIG. 9.

Also, the lighting apparatus 30 includes an apparatus body 31 and a diffusion part 32. The power supply device 10 and the light source unit 23 are attached to the apparatus body 31. The diffusion part 32 diffuses light emitted from the solid-state light emitting elements 22.

The apparatus body 31 includes a main body 33 having a bottomed tubular shape (a bottomed cylindrical shape, in the present embodiment) and a flange portion 34 that protrudes outward from an end portion of a side wall, on an opening side (lower side, in FIG. 8), of the main body 33. Metal (iron, aluminum, stainless steel, or the like, for example) or the like can be used as the material of the apparatus body 31, for example.

A first hole for the passage of a pair of second connection lines 35 and 36 that is electrically connected to the commercial power supply 25 (refer to FIG. 1) is formed in a bottom wall of the main body 33. The pair of second connection lines 35 and 36 is led out through a second hole 41 provided in advance in the ceiling member 40. The pair of second connection lines 35 and 36 is electrically connected to the power supply device 10 in the lighting apparatus 30.

A translucent material (acrylic resin, glass, or the like, for example) or the like can be used as the material of the diffusion part 32, for example. The diffusion part 32 is detachably attached to the flange portion 34 of the apparatus body 31.

A screw or the like is used as a means for directly attaching the apparatus body 31 to the ceiling member 40 in the lighting apparatus 30, for example. A third hole is formed in the bottom wall of the main body 33 for the passage of the screw.

Accordingly, the apparatus body 31 in the lighting apparatus 30 can be directly attached to the ceiling member 40.

The lighting apparatus 30 according to the present embodiment, as described above, includes the power supply device 10, the light source unit 23 including the solid-state light emitting element 22 that can be turned on by the power supply device 10, and the apparatus body 31 to which the power supply device 10 and the light source unit 23 are attached. Accordingly, the lighting apparatus 30 can be further downsized.

Embodiment 2

Figure 10:
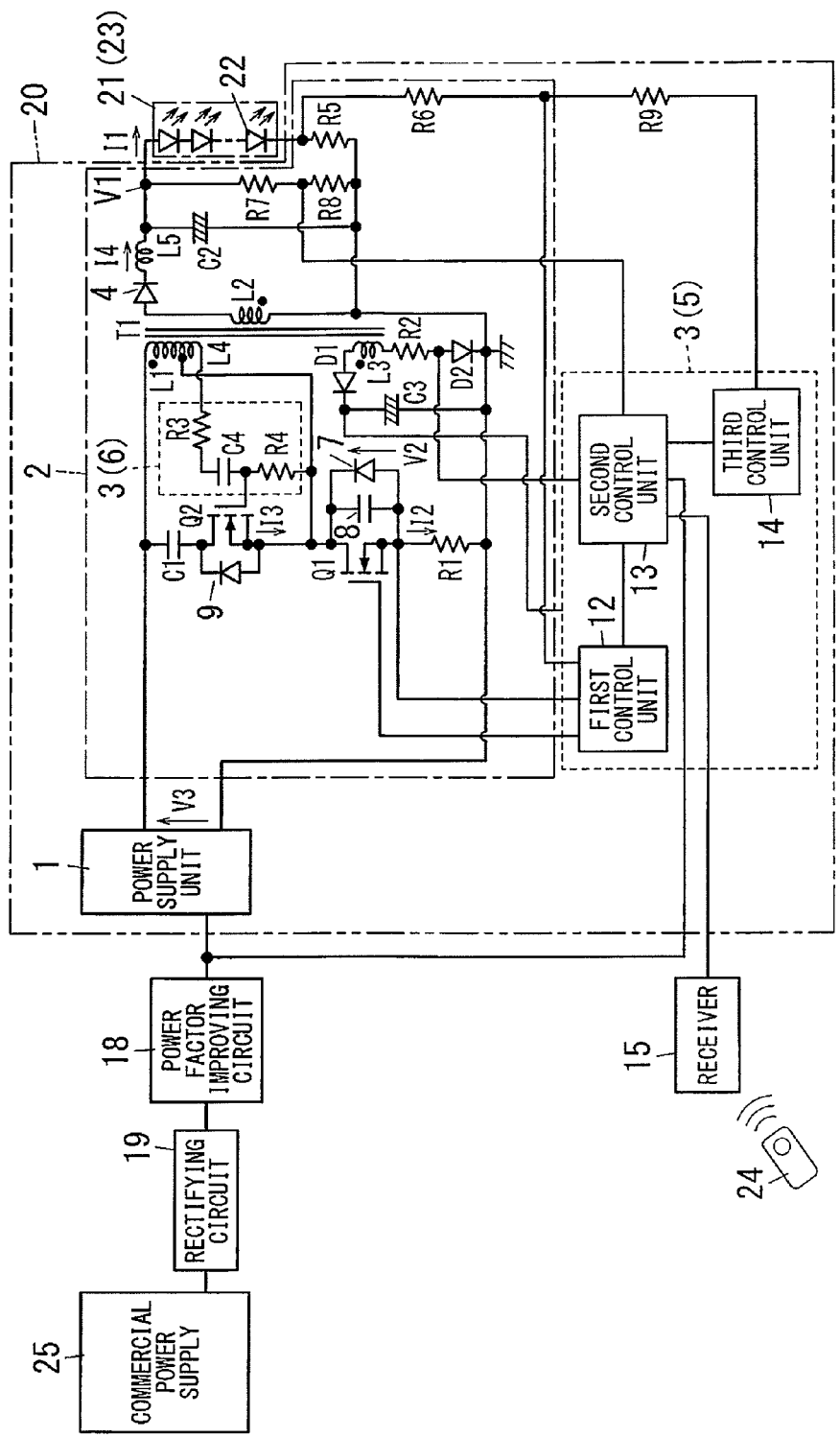
FIG. 10 is a circuit diagram of a power supply device according to Embodiment 2.
Figure 11:
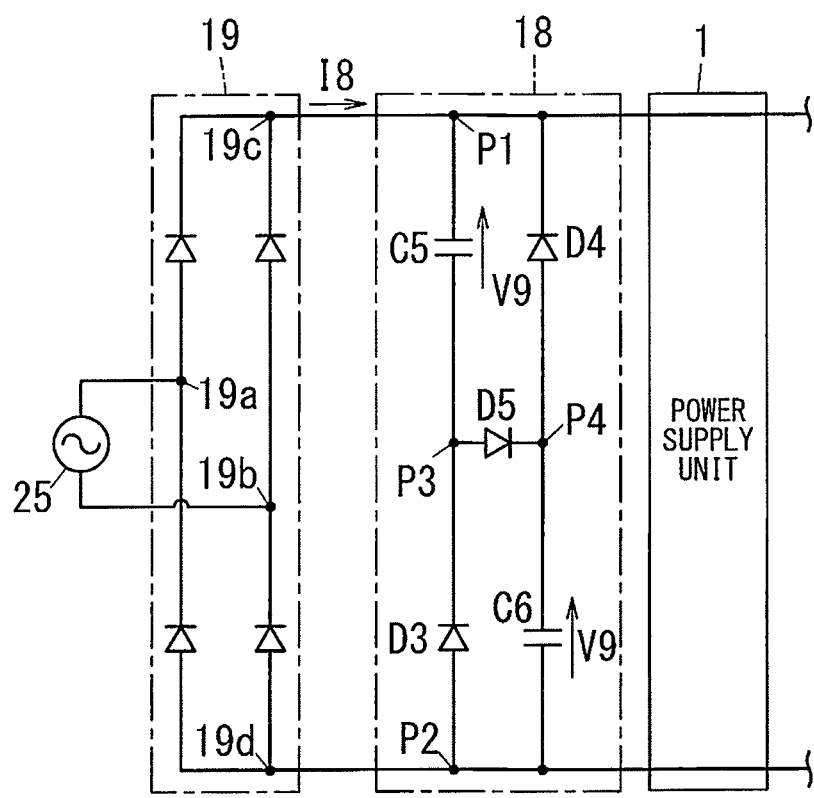
FIG. 11 is a circuit diagram illustrating a rectifying circuit, a power factor improving circuit, and a power supply unit in the power supply device according to Embodiment 2.

A power supply device 20 according to the present embodiment differs from the power supply device 10 according to the Embodiment 1 in that, as shown in FIGS. 10 and 11, a power factor improving circuit 18 for improving a power factor of a voltage (full-wave rectified voltage) resulting from full-wave rectification of a sine wave shaped AC voltage is electrically connected to an input side of a power supply unit 1. The basic configuration of the power supply device 20 according to the present embodiment is similar to the power supply device 10 according to the Embodiment 1. Note that, in the present embodiment, constituent elements similar to those in Embodiment 1 are provided with the same reference numerals, and description thereof will be omitted as appropriate.

The power supply unit 1 is configured to generate a first DC voltage using an output voltage of the power factor improving circuit 18 as an input voltage.

A rectifying circuit 19 configured to full-wave-rectify the sine wave shaped AC voltage is electrically connected to an input side of the power factor improving circuit 18. The rectifying circuit 19 full-wave-rectifies the sine wave shaped AC voltage. A commercial power supply 25 is electrically connected to an input side of the rectifying circuit 19, for example. Note that a wall switch is provided in a power supply path between the rectifying circuit 19 and the commercial power supply 25. The wall switch is configured to turn on and off power supply from the commercial power supply 25 to the power supply device 20.

A diode bridge, as shown in FIG. 11, or the like can be used as the rectifying circuit 19, for example. A pair of input terminals 19a and 19b of the diode bridge used as the rectifying circuit 19 is connected to the commercial power supply 25. A pair of output terminals 19c and 19d of the diode bridge used as the rectifying circuit 19 is connected to the power factor improving circuit 18.

A smoothing circuit configured to smooth a trough in a waveform of the full-wave rectified voltage resulting from full-wave rectification by the rectifying circuit 19 can be used as the power factor improving circuit 18, for example. The smoothing circuit includes three diodes D3 to D5 and two capacitors C5 and C6, as shown in FIG. 11, for example. In short, the power factor improving circuit 18 is a smoothing circuit that smoothes a trough in a waveform of the full-wave rectified voltage resulting from full-wave rectification by the rectifying circuit 19, and includes two or more diodes D3 to D5 (three, in the present embodiment) and two or more capacitors C5 and C6 (two, in the present embodiment).

A series circuit of the capacitor C5 and the diode D3 is connected between the pair of output terminals 19c and 19d of the rectifying circuit 19. A high potential side of the capacitor C5 is connected to the output terminal 19c of the rectifying circuit 19. A low potential side of the capacitor C5 is connected to a cathode of the diode D3. An anode of the diode D3 is connected to the output terminal 19d of the rectifying circuit 19.

A series circuit of the diode D4 and the capacitor C6 is connected between a connection point P1 of the high potential side of the capacitor C5 and the output terminal 19c of the rectifying circuit 19 and a connection point P2 of the anode of the diode D3 and the output terminal 19d of the rectifying circuit 19. A cathode of the diode D4 is connected to the connection point P1. An anode of the diode D4 is connected to the connection point P2 via the capacitor C6.

The diode D5 is connected between a connection point P3 of the capacitor C5 and the diode D3 and a connection point P4 of the diode D4 and the capacitor C6. An anode of the diode D5 is connected to the connection point P3. A cathode of the diode D5 is connected to the connection point P4.

In the power factor improving circuit 18, an output current I8 from the output terminal 19c of the rectifying circuit 19 flows to the output terminal 19d of the rectifying circuit 19 via a path constituted by the capacitor C5, the diode D5, and the capacitor C6. In the power factor improving circuit 18, the capacitor C5 and the capacitor C6 are set to have the same capacitance. Accordingly, in the power factor improving circuit 18, the capacitor C5 and the capacitor C6 are each charged in a period in which the voltage value of the full-wave rectified voltage resulting from full-wave rectification by the rectifying circuit 19 is relatively large.

The capacitor C5 and the capacitor C6 each discharge a charged voltage V9 charged in each of the capacitors C5 and C6 to the high potential side of the power factor improving circuit 18 in a period in which the voltage value of the full-wave rectified voltage is relatively small. Accordingly, the power factor improving circuit 18 can smooth a trough in the waveform of the voltage resulting from full-wave rectification. That is, the power factor improving circuit 18 is configured to smooth a trough in the waveform of the full-wave rectified voltage resulting from full-wave rectification by the rectifying circuit 19.

Note that, although the smoothing circuit is used as the power factor improving circuit 18 in the present embodiment, the power factor improving circuit 18 is not limited to the smoothing circuit. Also, although the power factor improving circuit 18 is provided on the input side of the power supply unit 1 in the present embodiment, the power factor improving circuit 18 is not limited to being provided on the input side of the power supply unit 1. Also, the power factor improving circuit 18 need not be provided to the power supply device 20. In this case, it is preferable that an AC/DC converter or the like is used as the power supply unit 1, for example.

In the power supply device 20 according to the present embodiment described above, the power factor improving circuit 18 is electrically connected to the input side of the power supply unit 1. The power factor improving circuit 18 improves the power factor of the full-wave rectified voltage resulting from full-wave rectification of the sine wave shaped AC voltage. The power supply unit 1 is configured to generate the first DC voltage using an output voltage of the power factor improving circuit 18 as the input voltage.

Accordingly, a higher power factor can be obtained in the power supply device 20 compared with the case where the power factor improving circuit 18 is not connected to the input side of the power supply unit 1. Thus, the power supply device 20 can satisfy the harmonic regulations (Japanese Industrial Standards JIS C 61000-3-2, for example).

Also, in the power supply device 20, the rectifying circuit 19 is electrically connected to the input side of the power factor improving circuit 18. The rectifying circuit 19 full-wave rectifies the sine wave shaped AC voltage. The power factor improving circuit 18 is a smoothing circuit that smoothes the trough in the waveform of the full-wave rectified voltage resulting from full-wave rectification by the rectifying circuit 19. Accordingly, a high power factor can be obtained in the power supply device 20 with a simple configuration.

Note that the power supply device 20 according to the present embodiment may be applied to the lighting apparatus 30 according to Embodiment 1, for example.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power supply device comprising:
   a power supply unit configured to generate a first DC voltage from an input voltage;
   a conversion unit configured to convert the first DC voltage outputted from the power supply unit to a second DC voltage that is different from the first DC voltage; and
   a control unit configured to control the conversion unit,
   the conversion unit being an active clamp type flyback converter, and comprising:
   a main switching element;
   a sub switching element;
   a flyback transformer comprising a primary winding and a secondary winding; and
   a rectifying element configured to perform half-wave rectification on a first voltage generated in the secondary winding,
   the main switching element and the sub switching element each comprising a first main terminal, a second main terminal, and a control terminal,
   the primary winding being connected in series to the main switching element, and being connected in parallel to a series circuit of a resonance capacitor and the sub switching element,
   the secondary winding being connected in series to a series circuit of the rectifying element and a resonance inductor,
   the control unit being configured to control the main switching element and the sub switching element, and comprising, as control modes, a first control mode in which the main switching element is put in an on state and the sub switching element is put in an off state,
   a second control mode in which the main switching element is put in an off state and the sub switching element is put in an on state, and
   a third control mode in which the main switching element and the sub switching element are both put in off states,
   the control unit being configured to alternate between the first control mode and the second control mode via the third control mode, and
   a capacitance of the resonance capacitor and an inductance of the resonance inductor each being set such that, in a period in which the main switching element is in an off state and the sub switching element is in an on state, a waveform, with respect to time in the period, of a second voltage that is generated between the first main terminal and the second main terminal of the main switching element takes a protruding curve shape, the second voltage being generated due to a resonance phenomenon of at least the resonance capacitor, the primary winding, and the resonance inductor.

2. The power supply device according to claim 1,
   wherein the rectifying element comprises a first diode,
   a first end of the primary winding is connected to a high potential side of the power supply unit, and is connected to the first main terminal of the sub switching element via the resonance capacitor,
   the second main terminal of the sub switching element is connected to a second end of the primary winding, and is connected to the first main terminal of the main switching element,
   the second main terminal of the main switching element is connected to a low potential side of the power supply unit,
   the control terminals of each of the main switching element and the sub switching element are connected to the control unit, and
   a first end of the secondary winding is connected to an anode of the first diode, a cathode of the first diode is connected to the resonance inductor, and a second end of the secondary winding is connected to the low potential side of the power supply unit.

3. The power supply device according to claim 1, wherein the capacitance of the resonance capacitor and the inductance of the resonance inductor are set such that, when the main switching element is in an off state and the sub switching element is in an on state, a peak value of the second voltage that is generated between the first main terminal and the second main terminal of the main switching element is greater than or equal to an output voltage of the power supply unit and less than a breakdown voltage of the main switching element.

4. The power supply device according to claim 1, wherein the capacitance of the resonance capacitor and the inductance of the resonance inductor are set such that, in the period in which the main switching element is in an off state and the sub switching element is in an on state, a waveform, with respect to time in the period, of a current that flows in the sub switching element takes an S shape.

5. The power supply device according to claim 1, wherein the control unit is configured to control the conversion unit such that an output current of the conversion unit is made constant.

6. The power supply device according to claim 1, wherein a coupling coefficient of the transformer is in a range of 0.9 to 1 inclusive.

7. The power supply device according to claim 1,
   wherein the control unit comprises:
   a first control circuit configured to control the main switching element; and
   a second control circuit configured to control the sub switching element,
   wherein a tertiary winding and a quaternary winding that are magnetically coupled to the primary winding are provided on a primary side of the transformer, and
   wherein the first control circuit is configured to use a voltage that is generated in the tertiary winding as an operation power supply, and control the main switching element based on a magnitude of an output current of the conversion unit, and
   the second control circuit is configured to control the sub switching element based on a magnitude of a voltage that is generated in the quaternary winding.

8. The power supply device according to claim 7, wherein the second control circuit is a self-excited type control circuit, and is configured to turn on and off the sub switching element in coordination with turning on and off of the main switching element by the first control circuit.

9. The power supply device according to claim 7, wherein the first control circuit is configured to receive a first detection signal corresponding to an output current of the conversion unit, a second detection signal corresponding to a current flowing in the main switching element, and a power supply information signal having power supply information including at least one of a waveform of the input voltage of the power supply unit, an amplitude in the waveform of the input voltage, and a phase in the waveform of the input voltage.

10. The power supply device according to claim 7,
wherein the first control circuit is configured to receive a third detection signal corresponding to an output voltage of the conversion unit, and
the first control circuit is configured to control the main switching element based on a magnitude of the third detection signal.

11. The power supply device according to claim 7,
wherein a phase control circuit configured to phase-control a sine wave shaped AC voltage is electrically connected to an input side of the power supply unit, and
wherein the power supply unit is configured to generate the first DC voltage using a voltage that is phase-controlled by the phase control circuit as the input voltage.

12. The power supply device according to claim 11, wherein the phase control circuit is configured to perform light modulation on a solid-state light emitting element that is electrically connected to an output side of the conversion unit.

13. The power supply device according to claim 12,
wherein the first control circuit is configured to receive a power supply information signal having power supply information including at least one of a waveform of the input voltage of the power supply unit, an amplitude in the waveform of the input voltage, and a phase in the waveform of the input voltage, and
wherein the power supply information signal is a first light modulation signal for instructing a light modulation level of the solid-state light emitting element, and is constituted by the waveform of the voltage that is phase-controlled by the phase control circuit.

14. The power supply device according to claim 7,
wherein a power factor improving circuit configured to improve a power factor of a full-wave rectified voltage resulting from full-wave rectification of a sine wave shaped AC voltage is electrically connected to an input side of the power supply unit, and
wherein the power supply unit is configured to generate the first DC voltage using an output voltage of the power factor improving circuit as the input voltage.

15. The power supply device according to claim 14,
wherein a rectifying circuit configured to full-wave rectify the sine wave shaped AC voltage is electrically connected to an input side of the power factor improving circuit, and
wherein the power factor improving circuit is a smoothing circuit configured to smooth a trough in a waveform of the full-wave rectified voltage that is full-wave rectified by the rectifying circuit.

16. The power supply device according to claim 9,
wherein the first control circuit comprises:
a first control unit configured to control turning on and off of the main switching element; and
a second control unit configured to control the first control unit, the first control unit is configured to receive a first detection signal corresponding to an output current of the conversion unit,
the second control unit is configured to receive the power supply information signal having power supply information including at least one of a waveform of the input voltage of the power supply unit, an amplitude in the waveform of the input voltage, and a phase in the waveform of the input voltage, and output, to the first control unit, a first control signal for controlling the first control unit based on the power supply information of the power supply information signal,
the first control signal is a first PWM signal, and
the first control unit is configured to control turning on and off of the main switching element based on a first duty ratio of the first control signal outputted from the second control unit and a magnitude of the first detection signal.

17. The power supply device according to claim 16,
wherein the second control unit is configured to receive a third detection signal corresponding to an output voltage of the conversion unit, and
the second control unit is configured to, when the magnitude of the third detection signal is a preset threshold value or more, stop turning on and off of the main switching element by the first control unit, or stop an operation of the conversion unit.

18. The power supply device according to claim 16,
wherein the second control unit is configured to receive a second light modulation signal for instructing a light modulation level of the solid-state light emitting element that is electrically connected to an output side of the conversion unit,
the second light modulation signal is a second PWM signal,
the second control unit is configured to output, to the first control unit, a second control signal for controlling the first control unit based on a second duty ratio of the second light modulation signal,
the second control signal is a third PWM signal, and
wherein the first control unit further comprises a function for controlling turning on and off of the main switching element based on a third duty ratio of the second control signal outputted from the second control unit and the magnitude of the first detection signal.

19. The power supply device according to claim 16,
wherein the first control circuit comprises a third control unit configured to output an adjusting signal for adjusting a magnitude of an output current of the conversion unit based on the power supply information of the power supply information signal that is inputted to the second control unit, and
wherein the first control unit is configured to receive a fourth detection signal comprising the first detection signal and the adjusting signal, and
the first control unit further comprises a function for controlling turning on and off of the main switching element based on a magnitude of the fourth detection signal.

20. A lighting apparatus comprising:
the power supply device according to any one of claim 1;
a light source unit that can be operated by the power supply device, and
an apparatus body to which the power supply device and the light source unit are attached.

* * * * *